United States Patent [19]
Takeda et al.

[11] Patent Number: 5,748,198
[45] Date of Patent: May 5, 1998

[54] POLYGON DATA CONVERSION DEVICE, THREE-DIMENSIONAL SIMULATOR APPARATUS, AND POLYGON DATA CONVERSION METHOD

[75] Inventors: Masaki Takeda, Toshima-ku; Komei Kato, Yokohama, both of Japan

[73] Assignee: Namco Ltd., Tokyo, Japan

[21] Appl. No.: 596,349

[22] PCT Filed: Jun. 16, 1995

[86] PCT No.: PCT/JP95/01204

§ 371 Date: Feb. 15, 1996

§ 102(e) Date: Feb. 15, 1996

[87] PCT Pub. No.: WO95/35554

PCT Pub. Date: Dec. 28, 1995

[30] Foreign Application Priority Data

Jun. 17, 1994 [JP] Japan ................................. 6-159271

[51] Int. Cl.[6] ....................................................... G06F 15/00
[52] U.S. Cl. ............................................................. 345/441
[58] Field of Search ................................. 345/441, 442, 345/443, 433, 434

[56] References Cited

U.S. PATENT DOCUMENTS 5,341,467  8/1994  Klassen ................................. 395/142

FOREIGN PATENT DOCUMENTS 6-4646  1/1994  Japan .

Primary Examiner—Phu K. Nguyen
Attorney, Agent, or Firm—Oliff & Berridge, P.L.C.

[57] ABSTRACT

The present invention is geared to provide a polygon data conversion device and three-dimensional simulator apparatus capable of efficiently using hardware that cannot form backface polygons. A coordinate inversion section (410) performs horizontally and vertically inverts the vertex coordinates of an input polygon based on horizontal and vertical inversion flags. A back-and-front determination section (408) determines whether the input polygon is a backface or frontface polygon, by checking the sequence of numbers allocated to the vertices. An allocation sequence switching section (420) switches this allocation sequence based on an exclusive OR of the back determination flag, horizontal inversion flag, and vertical inversion flag. A vertex number assignment section (422) assigns the vertex numbers of the original input polygon to polygonal segments of that polygon. Data such as the vertex coordinates and reversed vertex coordinates of this polygon is read from a data memory (412) in accordance with these vertex numbers.

22 Claims, 25 Drawing Sheets

|  | | VERTICAL INVERSION FLAG | |
|---|---|---|---|
|  | | 0 | 1 |
| HORIZONTAL INVERSION FLAG | 0 | X, Y | X, -Y |
|  | 1 | -X, Y | -X, -Y |

FIG. 3A

| BACK DETERMI- NATION FLAG | HORIZON- TAL INVERSION FLAG | VERTICAL INVERSION FLAG | SWITCHING FLAG |
|---|---|---|---|
| 0 | 0 | 0 | 0 |
| 0 | 0 | 1 | 1 |
| 0 | 1 | 0 | 1 |
| 0 | 1 | 1 | 0 |
| 1 | 0 | 0 | 1 |
| 1 | 0 | 1 | 0 |
| 1 | 1 | 0 | 0 |
| 1 | 1 | 1 | 1 |

FIG. 3B

| SWITCHING FLAG \ ALLOCATION SEQUENCE | 1 | 2 | 3 | 4 |
|---|---|---|---|---|
| 0 | 1 | 2 | 3 | 4 |
| 1 | 1 | 4 | 3 | 2 |

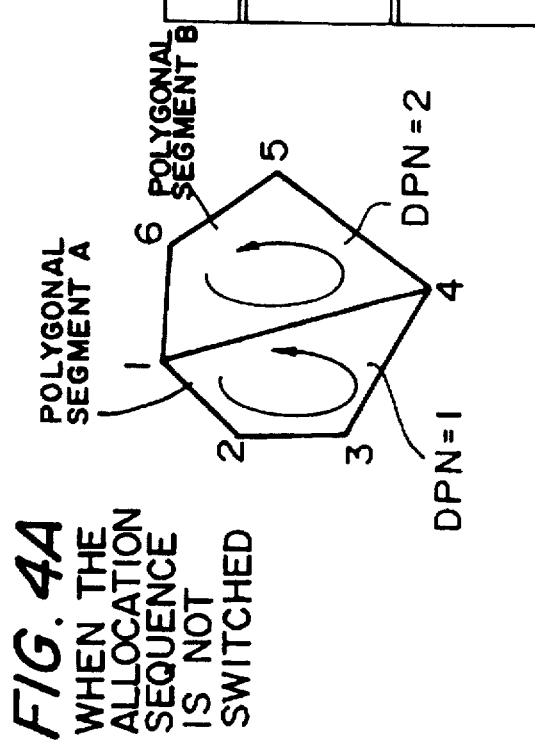
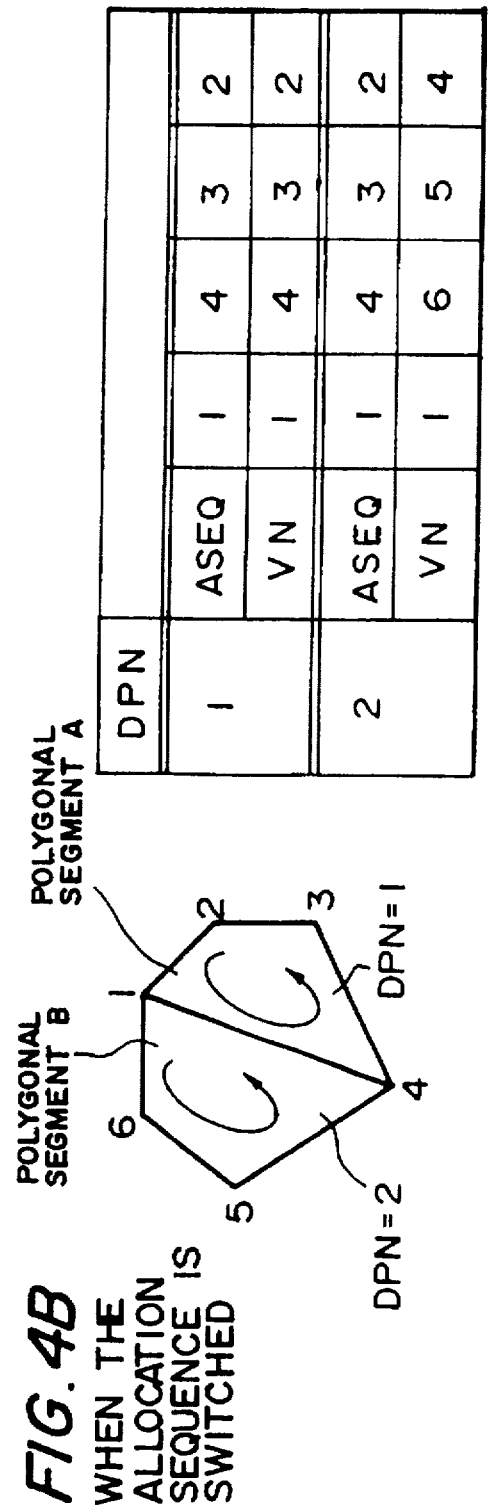
FIG. 4A WHEN THE ALLOCATION SEQUENCE IS NOT SWITCHED
FIG. 4B WHEN THE ALLOCATION SEQUENCE IS SWITCHED

WHEN THE ALLOCATION SEQUENCE IS NOT SWITCHED

| DPN | | | | | |
|---|---|---|---|---|---|
| 1 | ASEQ | 1 | 2 | 3 | 4 |
|   | VN   | 1 | 2 | 3 | 4 |
| 2 | ASEQ | 1 | 2 | 3 | 4 |
|   | VN   | 1 | 4 | 5 | 6 |
| 3 | ASEQ | 1 | 2 | 3 | 4 |
|   | VN   | 1 | 6 | 7 | — |

WHEN THE ALLOCATION SEQUENCE IS SWITCHED

| DPN | | | | | |
|---|---|---|---|---|---|
| 1 | ASEQ | 1 | 4 | 3 | 2 |
|   | VN   | 1 | 4 | 3 | 2 |
| 2 | ASEQ | 1 | 4 | 3 | 2 |
|   | VN   | 1 | 6 | 5 | 4 |
| 3 | ASEQ | 1 | 4 | 3 | 2 |
|   | VN   | 1 | 7 | 6 | — |

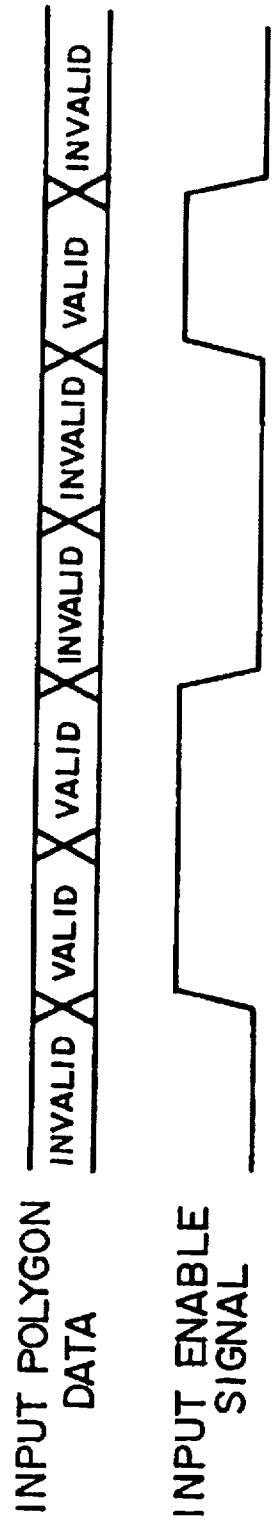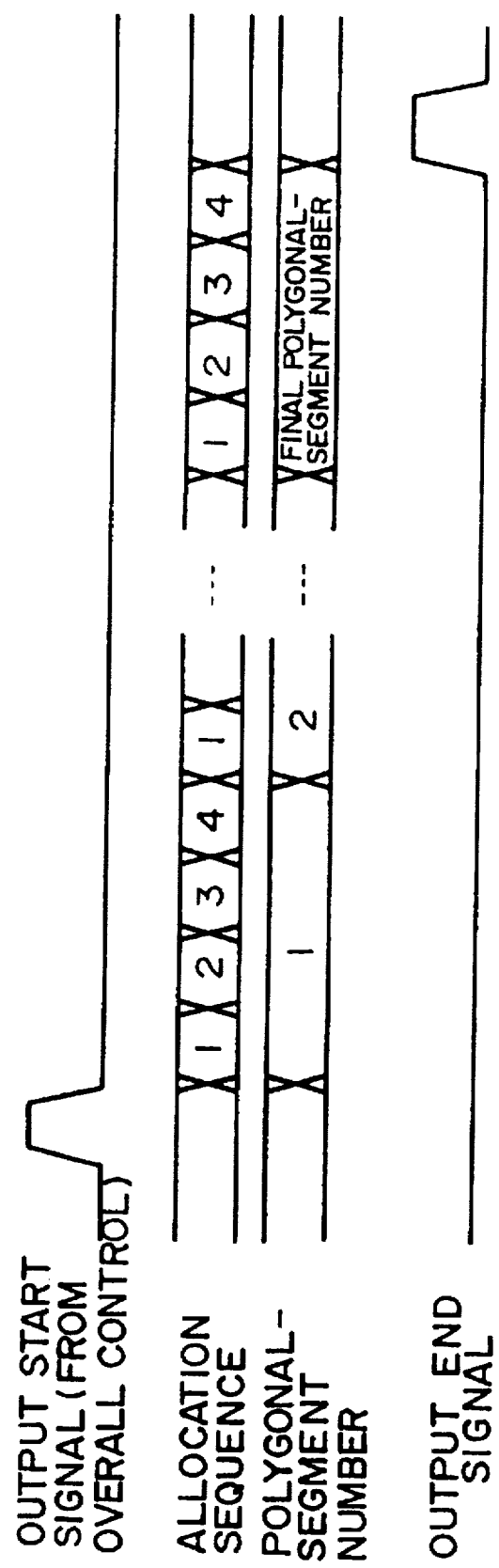

FIG. 14

| OBJECT NUMBER | POSITION INFORMATION | | | ORIENTATION INFORMATION | | |
|---|---|---|---|---|---|---|
| $OB_0$ | $X_0$ | $Y_0$ | $Z_0$ | $\theta_0$ | $\phi_0$ | $\rho_0$ |
| $OB_1$ | $X_1$ | $Y_1$ | $Z_1$ | $\theta_1$ | $\phi_1$ | $\rho_1$ |
| $OB_2$ | $X_2$ | $Y_2$ | $Z_2$ | $\theta_2$ | $\phi_2$ | $\rho_2$ |
| $OB_3$ | $X_3$ | $Y_3$ | $Z_3$ | $\theta_3$ | $\phi_3$ | $\rho_3$ |
| $OB_4$ | $X_4$ | $Y_4$ | $Z_4$ | $\theta_4$ | $\phi_4$ | $\rho_4$ |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| $OB_{i-2}$ | $X_{m-2}$ | $Y_{m-2}$ | $Z_{m-2}$ | $\theta_{m-2}$ | $\phi_{m-2}$ | $\rho_{m-2}$ |
| $OB_{i-1}$ | $X_{m-1}$ | $Y_{m-1}$ | $Z_{m-1}$ | $\theta_{m-1}$ | $\phi_{m-1}$ | $\rho_{m-1}$ |
| $OB_i$ | $X_m$ | $Y_m$ | $Z_m$ | $\theta_m$ | $\phi_m$ | $\rho_m$ |

FIG. 16A

| OBJECT NUMBER | POSITION INFORMATION | | | ORIENTATION INFORMATION | | |
|---|---|---|---|---|---|---|
| $OB_0$ | $X_0$ | $Y_0$ | $Z_0$ | $\theta_0$ | $\phi_0$ | $\rho_0$ |
| $OB_1$ | $X_1$ | $Y_1$ | $Z_1$ | $\theta_1$ | $\phi_1$ | $\rho_1$ |
| $OB_2$ | $X_2$ | $Y_2$ | $Z_2$ | $\theta_2$ | $\phi_2$ | $\rho_2$ |
| $OB_3$ | $X_3$ | $Y_3$ | $Z_3$ | $\theta_3$ | $\phi_3$ | $\rho_3$ |
| $OB_4$ | $X_4$ | $Y_4$ | $Z_4$ | $\theta_4$ | $\phi_4$ | $\rho_4$ |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| $OB_{i-2}$ | $X_{m-2}$ | $Y_{m-2}$ | $Z_{m-2}$ | $\theta_{m-2}$ | $\phi_{m-2}$ | $\rho_{m-2}$ |
| $OB_{i-1}$ | $X_{m-1}$ | $Y_{m-1}$ | $Z_{m-1}$ | $\theta_{m-1}$ | $\phi_{m-1}$ | $\rho_{m-1}$ |
| $OB_i$ | $X_m$ | $Y_m$ | $Z_m$ | $\theta_m$ | $\phi_m$ | $\rho_m$ |

FIG. 16B

| OBJECT NUMBER | POSITION INFORMATION | | | ORIENTATION INFORMATION | | |
|---|---|---|---|---|---|---|
| $OB_{i+1}$ | $X_0$ | $Y_0$ | $Z_0$ | $\theta_0$ | $\phi_0$ | $\rho_0$ |
| $OB_{i+2}$ | $X_1$ | $Y_1$ | $Z_1$ | $\theta_1$ | $\phi_1$ | $\rho_1$ |
| $OB_{i+3}$ | $X_2$ | $Y_2$ | $Z_2$ | $\theta_2$ | $\phi_2$ | $\rho_2$ |
| $OB_{i+4}$ | $X_3$ | $Y_3$ | $Z_3$ | $\theta_3$ | $\phi_3$ | $\rho_3$ |
| $OB_{i+5}$ | $X_4$ | $Y_4$ | $Z_4$ | $\theta_4$ | $\phi_4$ | $\rho_4$ |
| ⋮ | ⋮ | ⋮ | ⋮ | ⋮ | ⋮ | ⋮ |
| ⋮ | ⋮ | ⋮ | ⋮ | ⋮ | ⋮ | ⋮ |
| $OB_{j-2}$ | $X_{m-2}$ | $Y_{m-2}$ | $Z_{m-2}$ | $\theta_{m-2}$ | $\phi_{m-2}$ | $\rho_{m-2}$ |
| $OB_{j-1}$ | $X_{m-1}$ | $Y_{m-1}$ | $Z_{m-1}$ | $\theta_{m-1}$ | $\phi_{m-1}$ | $\rho_{m-1}$ |
| $OB_j$ | $X_m$ | $Y_m$ | $Z_m$ | $\theta_m$ | $\phi_m$ | $\rho_m$ |

POLYGON DATA CONVERSION DEVICE, THREE-DIMENSIONAL SIMULATOR APPARATUS, AND POLYGON DATA CONVERSION METHOD

TECHNICAL FIELD

The present invention relates to a polygon data conversion device that converts polygon data which is input thereto into polygon data of a predetermined format for output, and a three-dimensional (3D) simulator apparatus and polygon data conversion method that use the polygon data conversion device.

BACKGROUND OF ART

Various types of 3D simulator apparatus that are used in applications such as 3D games or piloting simulators for aircraft or other moving objects are known in the art. With such a 3D simulator apparatus, image information relating to a 3D object 300 shown in FIG. 23A is previously stored within the apparatus. In this case, the 3D object 300 depicts an element such as scenery that can be seen by a player 302 on a screen 306. The image information for the 3D object 300 that expresses this scenery element is displayed as a pseudo-3D image 308 on the screen 306, by perspective projection conversion on the screen 306. The player 302 specifies operations such as rotation or forward motion through a control panel 304, and the present apparatus performs predetermined 3D computation processing on the basis of the resultant operating signals. More specifically, computations are first performed to determine what changes take place in terms of the viewpoint, where the player 302's eyes are directed, and the position or orientation of a moving object in which the player 302 is sitting, as specified by these operating signals. Computations are then performed to determine how the image of the 3D object 300 can be seen on the screen 306, in accordance with the change in viewpoint or where the player's eyes are directed. The above computations are performed in real time, following the operations of the player 302. This makes it possible for the player 302 to see any change in the scenery due to changes in the player's own viewpoint or where the player's eyes are directed, or the position or orientation of the moving object in which the player is sitting, as a pseudo-3D image in real time, to simulate the experience of a virtual 3D space.

An example of a display screen formed by a 3D simulator apparatus as described above is shown in FIG. 23B.

In such a driving game or simulator, the realism of the game or simulation can be enhanced by forming a subscreen depicting an element such as a rear-view mirror or a side mirror on a display screen (main screen) as shown in FIG. 23B.

To further enhance the sense of realism in the game or other simulation in this case, it is preferable that a pseudo-3D image with a degree of realism that is similar to that of the main screen is displayed on the sub-screen, such as the rear-view mirror. To that end, it is first necessary to obtain a rearward-facing field-of-view image as seen from the player's viewpoint. It is then necessary to obtain an image that is the rearward-facing field-of-view image inverted in a mirror, in other words, an image obtained by subjecting this field-of-view image to horizontal i.e., right-to-left inversion, and display that image on the main screen as an image as seen in a rear-view mirror.

With the 3D simulator apparatus described with reference to FIG. 23A, each 3D object is divided into polygons (1) to (6) (where polygons (4) to (6) are not shown in the figure) and the field-of-view image is synthesized therefrom. Unfortunately, a simulator apparatus of this type has a limitation in that the computations for synthesizing the images should be completed within one frame, which may take only 1/60 second. It is therefore usual to have hardware that forms only frontface polygons and not backface polygons, to reduce the amount of computation processing necessary for image synthesis. In this case, a frontface polygon is one that is the frontface of an image as seen from the viewpoint; a backface polygon is one that is the backface of an image as seen from the viewpoint. Whether a polygon is a frontface or backface polygon is determined from the order in which vertex numbers are allocated to the vertices of the polygon. For example, a polygon is determined to be a frontface polygon if the allocation sequence of the vertex numbers is counterclockwise, or a backface polygon if it is clockwise (or vice versa).

However, if hardware that forms only frontface polygons is used to perform the above described horizontal inversion of a field-of-view image when forming an image of a rear-view mirror on the main screen, a problem occurs in that a frontface polygon may become a backface polygon and that particular polygon is omitted from the image formation. To reduce the computation load and design a less expensive apparatus, it is necessary to ensure that the hardware configuration draws only frontface polygons, leaving backface polygons out. Therefore, a topic of technical concern is how to form a correct image of a rear-view mirror on the main screen, using a hardware configuration that can be made less expensive.

Depending on the game, it may be desirable to display backface polygons as well. For example, consider a case in which the moving object operated by the player bursts into an enclosed space, like that of a balloon. In such a case, hardware that draws only frontface polygons would be unable to draw the interior of the balloon. For that reason, a strange situation will occur in that nothing will be displayed around the player at the instant that the moving object bursts into the balloon. To prevent this, it is necessary to use some means such as a configuration in which different polygons are arranged over the interior of the balloon in such a manner as to completely cover the interior. However, use of such a configuration doubles the number of polygons required, impeding the provision of fast image processing, a more compact apparatus, and lower costs.

The 3D simulation apparatus shown in FIG. 23A also performs a process called clipping, before perspective projection conversion. When this clipping processing is performed, polygons at the boundaries formed by clipping surfaces are changed into polygonal shapes that are not four-sided, and thus it is necessary to convert these misshapen polygons into four-sided polygons. During the conversion, a topic of technical concern relates to how to transfer the back-and-front information that the original had to the converted polygons.

The present invention has been devised in order to solve the above technical problems, and has as its objective the provision of a polygon data conversion device that can use hardware that cannot draw backface polygons, a 3D simulator apparatus that comprises this polygon data conversion device, and a polygon data conversion method.

DISCLOSURE OF THE INVENTION

In order to solve the above problems, a first aspect of the present invention provides a polygon data conversion device that converts polygon data which is input thereto into polygon data of a predetermined format and outputs, the converted polygon data comprising:

coordinate inversion means for horizontally inverting vertex coordinates of an input polygon based on a horizontal inversion flag that is information specifying whether or not horizontal inversion is to be performed;

switching means for switching a sequence of numbers allocated to vertices of the polygon based on the horizontal inversion flag; and output means for outputting horizontally inverted vertex coordinates in accordance with the switched vertex number allocation sequence; and wherein the coordinate inversion means horizontally inverts the vertex coordinates of the input polygon when the horizontal inversion flag is true; and the switching means switches the vertex number allocation sequence to reverse backface and frontface of the polygon, when the horizontal inversion flag is true.

With this aspect of the invention, if the horizontal (right-and-left) inversion flag is true (if it is set), the vertex coordinates of the input polygon are subjected to a horizontal inversion and also the sequence of numbers which are allocated to the vertices is switched in such a manner that the backface and frontface of the polygon are reversed. This makes it possible for a polygon that has been turned into a backface polygon by the horizontal inversion to be output as a frontface polygon. As a result, a side mirror (horizontally inverted image) can be depicted on a main screen, when the present apparatus is applied to a three-dimensional(3D) simulator apparatus, for example. In other words, a field-of-view image as seen from a predetermined viewpoint in the virtual 3D space can be obtained. This field-of-view image is subjected to horizontal inversion by the present apparatus, and also any polygon that has been turned into a backface polygon by the horizontal inversion returns to a frontface polygon. This makes it possible to depict a side mirror on the main screen with the same degree of realism as that of the main screen.

A second aspect of the present invention provides a polygon data conversion device that converts polygon data which is input thereto into polygon data of a predetermined format and outputs the converted polygon data, comprising:

coordinate inversion means for vertically inverting vertex coordinates of an input polygon based on a vertical inversion flag that is information specifying whether or not vertical inversion is to be performed;

switching means for switching a sequence of numbers allocated to vertices of the polygon based on the vertical inversion flag; and output means for outputting vertically inverted vertex coordinates in accordance with the switched vertex number allocation sequence; and wherein the coordinate inversion means vertically inverts the vertex coordinates of the input polygon when the vertical inversion flag is true; and the switching means switches the vertex number allocation sequence to reverse backface and frontface of the polygon, when the vertical inversion flag is true.

With this aspect of the invention, a polygon that has been subjected to vertical (up-and-down) inversion and has become a backface polygon can be output as a frontface polygon.

A third aspect of the present invention provides a polygon data conversion device that converts polygon data which is input thereto into polygon data of a predetermined format and outputs the converted polygon data, comprising:

back-and-front determination means for determining whether an input polygon is a backface or frontface polygon by checking a sequence of numbers allocated to vertices of the polygon;

switching means for switching the vertex number allocation sequence based on a determination result obtained by the back-and-front determination means and a backface polygon output flag that is information specifying whether or not a backface polygon is to be output; and output means for outputting vertex coordinates in accordance with the switched vertex number allocation sequence; and wherein the switching means switches the vertex number allocation sequence to reverse backface and frontface of the polygon, when the back-and-front determination means determines that the input polygon is a backface polygon and also the backface polygon output flag is true.

With this aspect of the invention, if the backface polygon output flag becomes true, the sequence of numbers which are allocated to the vertices is switched in such a manner that backface and frontface of the polygon are reversed, even if the input polygon is determined by the back-and-front determination means to be a backface polygon. This ensures that it can be output as a frontface polygon, even if it is actually a backface polygon, but only when the backface polygon output flag is true. This means that the backface and frontface of a thin object such as a flag, wall, or plate can be represented by a single polygon, making it possible to achieve good visual effects with a small number of polygons.

A fourth aspect of the present invention further comprises means for individually setting the backface polygon output flag for each polygon that is to be processed.

This aspect of the invention makes it possible to set each polygon to be output individually, even when that polygon is a backface polygon. In other words, the computation processing load would become too great if an attempt is made to draw backface polygons for all of the polygons. In such a case, the computation processing load can be reduced and a special visual effect can be achieved by using the backface polygon output flag to draw backface of only necessary polygons, and not drawing backface of other polygons.

A fifth aspect of the present invention provides a polygon data conversion device that converts polygon data which is input thereto into polygon data of a predetermined format and outputs the converted polygon data, comprising:

back-and-front determination means for determining whether an input polygon is a backface or frontface polygon by checking a sequence of numbers allocated to vertices of the polygon;

coordinate inversion means for horizontally and vertically inverting vertex coordinates of an input polygon based on a horizontal inversion flag that is information specifying whether or not horizontal inversion is to be performed and a vertical inversion flag that is information specifying whether or not vertical inversion is to be performed;

switching means for switching the vertex number allocation sequence based on a determination result obtained by the back-and-front determination means, the horizontal inversion flag, and the vertical inversion flag; and output means for outputting horizontally and vertically inverted vertex coordinates in accordance with the switched vertex number allocation sequence; and wherein the coordinate inversion means horizontally inverts the vertex coordinates of the input polygon when the horizontal inversion flag is true and vertically inverts the vertex coordinates when the vertical inversion flag is true; and the switching means switches the vertex number allocation sequence to reverse backface and frontface of the polygon when an exclusive OR of the determination result obtained by the back-and-front determination means, the horizontal inversion flag, and the vertical inversion flag directs the vertex number allocation sequence to be switched.

With this aspect of the invention, the vertex coordinates of the input polygon are subjected to horizontal and vertical inversion if the horizontal inversion flag and vertical inversion flag are true. In addition, an exclusive OR is taken of a back determination flag, the horizontal inversion flag, and the vertical inversion flag, and if the number of flags that are true is odd, the allocation sequence is switched in such a manner that the backface and frontface of the polygon are reversed. This ensures that a polygon that has become a backface polygon as a result of horizontal or vertical inversion can be output as a frontface polygon. Even a polygon that has been subjected to horizontal inversion and then vertical inversion, for example, can be output correctly as a frontface polygon.

A sixth aspect of the present invention further comprises assignment means for dividing an input polygon having any number of vertices into at least one polygonal segment having a predetermined number of vertices and the assignment means for assigning vertex numbers of the input polygon to the at least one polygonal segment in accordance with the switched vertex number allocation sequence; and wherein the output means outputs one of the vertex coordinates of the input polygon and the inverted vertex coordinates based on the vertex numbers assigned by the assignment means.

With this aspect of the invention, an input polygon having any number of vertices is divided into a polygons having a predetermined number of vertices, such as four-sided polygons. In addition, vertex numbers of the original input polygon are assigned to the vertices of the polygonal segments in accordance with the switched allocation sequence. The vertex coordinates of the input polygon, or the inverted vertex coordinates, are output on the basis of the thus assigned vertex numbers. This makes it possible to divide a polygon that has been converted into a polygonal shape that is not four-sided by the clipping processing, for example, into four-sided polygons. The vertex numbers of these polygonal segments can also be subjected to switching processing. This makes it possible to divide up the input polygon while carrying out other processing such as take a polygon that has become a backface polygon as a result of horizontal and/or vertical inversion and return it to being a frontface polygon.

A seventh aspect of this invention is further characterized in that the assignment means assigns the first vertex number of the input polygon to a vertex-number-unassigned vertex of a polygonal segment having vertices less than the predetermined number, when the input polygon has an odd number of vertices.

When it is not possible to divide an input polygon into four-sided polygonal segments because the input polygon has an odd number of vertices, and thus the final polygonal segment ends up as a triangular shape, for example, this aspect of the invention makes it possible to set vertex number 1 to a final vertex that has not been assigned a vertex number. Thus a polygon that actually has a triangular shape can be output to subsequent hardware stages as a four-sided polygonal shape. This makes it possible to guarantee correct operation by handling a three-sided polygon as a four-sided polygon, to enable faster processing in subsequent hardware stages such as the image forming section, even with hardware that can only draw four-sided polygons.

A eighth aspect of the present invention provides a 3D simulator apparatus comprising the above described polygon data conversion device, further comprises:

image forming means for forming a field-of-view image from any desired position within a virtual 3D space based on polygon data which is converted by the polygon data conversion device; and wherein the image forming means comprises means for omitting the image forming processing for forming the field-of-view image with respect to polygons wherein vertex numbers are allocated to vertices thereof in a predetermined sequence.

With this aspect of the invention, image forming processing is omitted for polygons wherein numbers are allocated to the vertices thereof in a predetermined sequence. Thus polygons that have become backface polygons after being subjected to horizontal inversion processing, for example, can usually be omitted from the drawing of backface polygons. However, since the sequence of numbers when are allocated to the vertices by the polygon data conversion device can be switched in such a manner that backface and frontface of the polygon are reversed, even a backface polygon can be output as a frontface polygon. This aspect of the invention makes it possible to simplify and speed up the polygon drawing and design a smaller apparatus by omitting the drawing of backface polygons.

A ninth aspect of the present invention provides a 3D simulator apparatus comprising the above described polygon data conversion device, further comprises:

image forming means for forming a field-of-view image from any desired position within a virtual 3D space based on polygon data which is converted by the polygon data conversion device; and wherein the image forming means comprises means for omitting the image forming processing for forming the field-of-view image with respect to polygons having vertices unequal to the predetermined number.

This aspect of the invention omits the drawing of polygons not having a predetermined number of vertices, for example, polygons other than four-sided polygons. Therefore, if polygons that have been distorted by the clipping processing into polygonal shapes that are not four-sided, are input to the image forming means, the corresponding image forming processing is omitted. However, these deformed polygons can be divided into four-sided polygonal shapes by the polygon data conversion device, so that the thus-converted polygonal shapes can be drawn. This aspect of the invention makes it possible to simplify and speed up the polygon drawing and design a smaller apparatus by omitting the drawing of polygons other than four-sided polygons, but it also enables the display of backface polygons.

BRIEF DESCRIPTION OF DRAWINGS

FIG. 3A shows the truth table of an exclusive OR section and FIG. 3B is a diagram for illustrating the switching of an allocation sequence as set by a switching flag;

FIGS. 4A and 4B are diagrams illustrating the relationships between DPN, ASEQ, and VN when a six-sided polygon is segmented;

FIGS. 7A and 7B are timing charts of the operation of the apparatus of the present embodiment;

FIGS. 9A and 9B show display screens while

FIG. 14 is a schematic descriptive view of display object information that is stored in the display object information storage section;

FIGS. 16A and 16B are schematic views illustrating groups of display object information with the same position and orientation information but different object numbers;

BEST MODE FOR CARRYING OUT THE INVENTION

A. First Embodiment

Figure 1A:
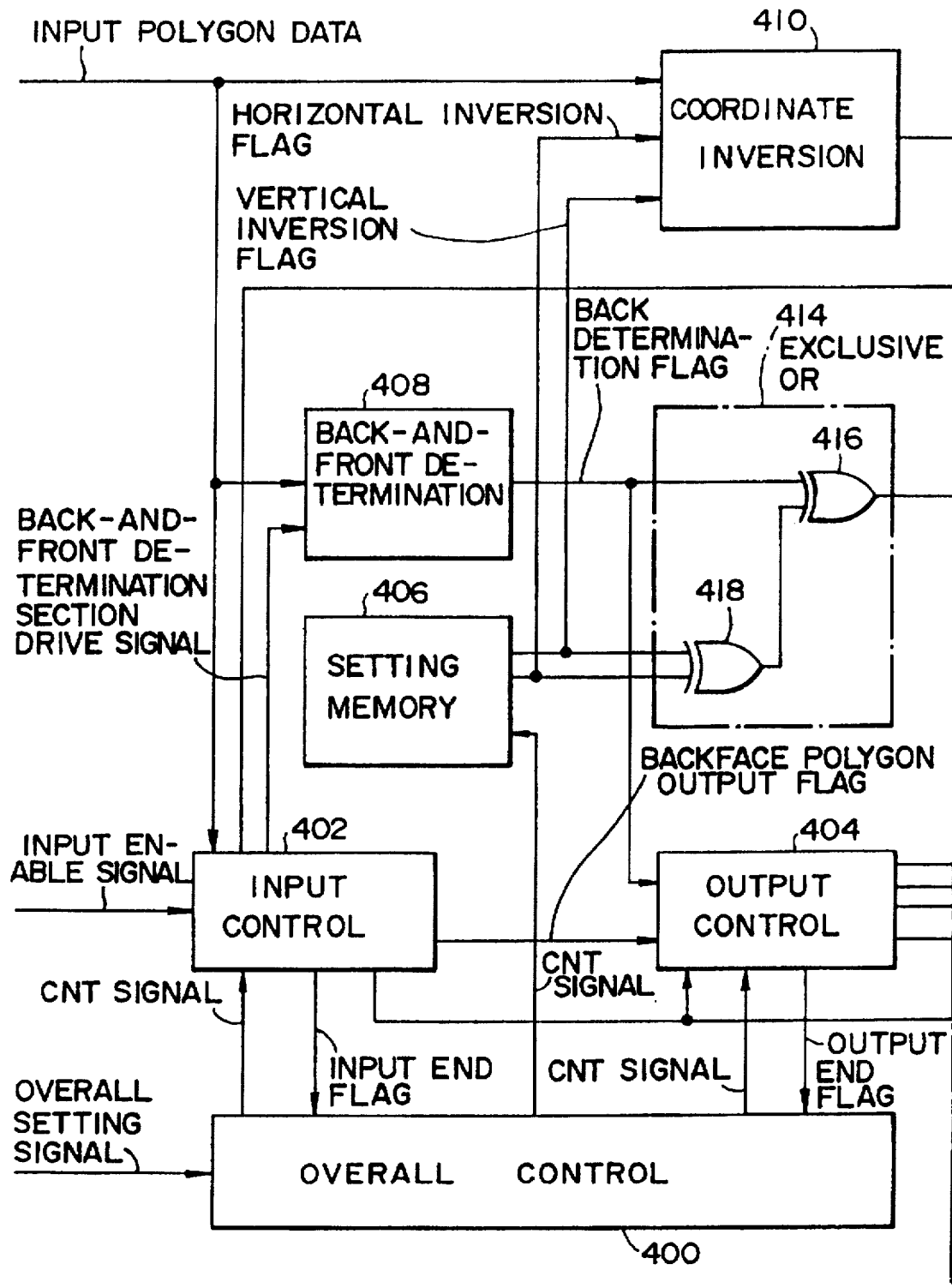
FIG. 1 is a block diagram of a first embodiment of the present invention.
Figure 1B:
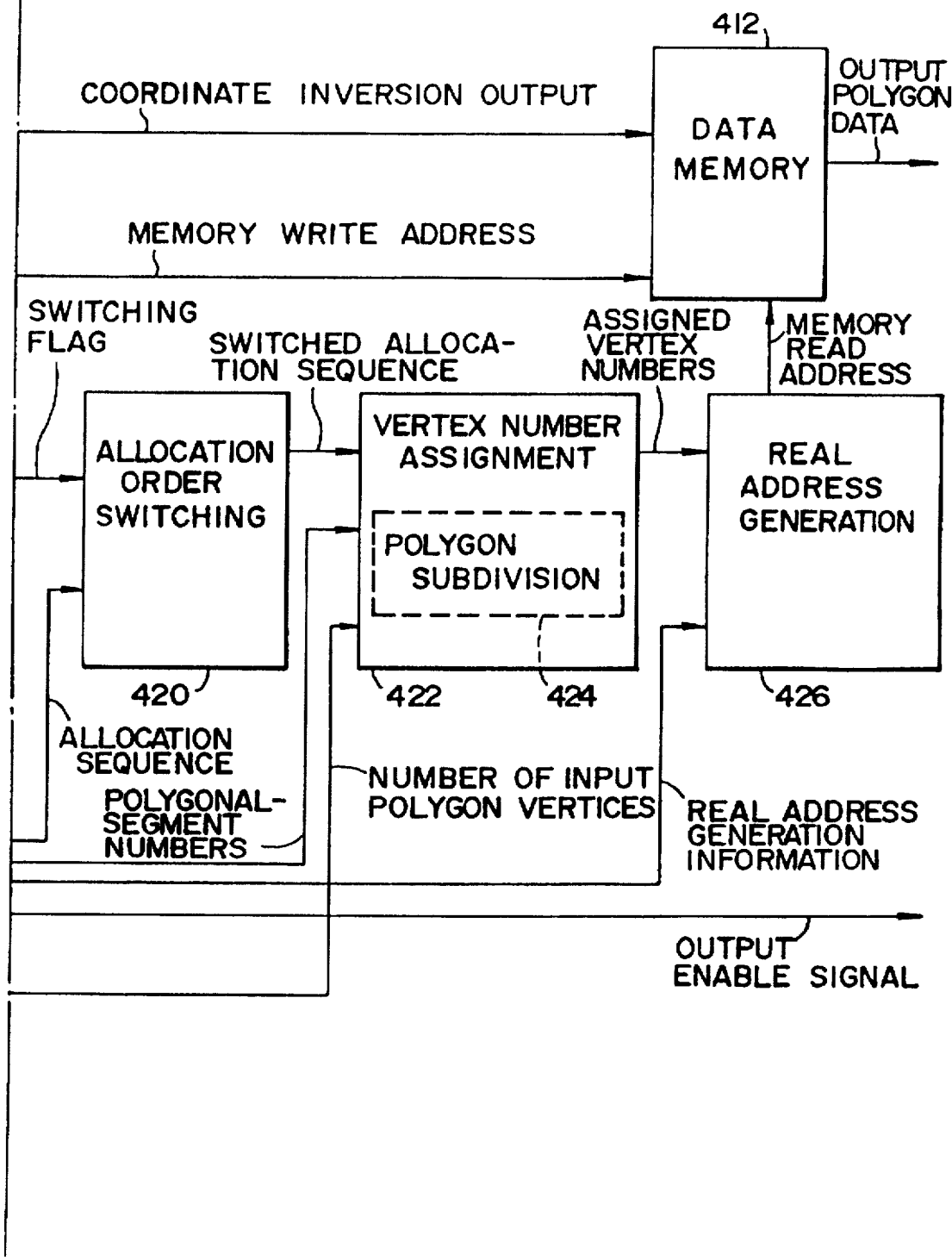

A block diagram of a polygon data conversion device in accordance with a first embodiment of the present invention is shown in FIG. 1.

As shown in FIG. 1, the polygon data conversion device comprises an overall control section 400, an input control section 402, an output control section 404, a setting memory 406, a back-and-front determination section 408, a coordinate inversion section 410, a data memory 412, an exclusive OR section 414, an allocation sequence switching section 420, a vertex number assignment section 422, and a real address generation section 426. The polygon data conversion device inverts coordinates and switches the allocation sequence of vertex numbers with respect to polygon data that is input thereto, on the basis of information set in the setting memory 406, and outputs that data as output polygon data.

In this case, the overall control section 400 controls the entire apparatus; it inputs signals such as overall setting signals and controls the other sections such as the input control section 402, the output control section 404, and the setting memory 406 by control (CNT) signals.

The input control section 402 has the function of controls the input of polygon data; it inputs an input enable signal from outside the apparatus and controls other sections such as the back-and-front determination section 408 and the data memory 412 by means such as a back-and-front determination drive signal and a memory write address. The input control section 402 also outputs the number of vertices of the input polygons, obtained from the input polygon data, to the output control section 404 and the vertex number assignment section 422.

The output control section 404 controls the output of polygon data; it provides control such that polygon data is not output by setting a backface polygon output flag when a back determination flag is asserted (when it is active), or a backface polygon is output as a frontface polygon. To enable this control, the back determination flag (an output of the back-and-front determination section 408) and the backface polygon output flag (included in header information of the input polygon data) are input to the output control section 404 which also outputs an allocation sequence to the allocation sequence switching section 420, a polygonal-segment number to the vertex number assignment section 422, and information for generating a real address to the real address generation section 426. It also outputs an output enable signal to the exterior of the apparatus.

A horizontal (right-and-left) inversion flag and vertical (up-and-down) inversion flag are stored in the setting memory 406, and these horizontal and vertical inversion flags are output to the coordinate inversion section 410 and the exclusive OR section 414.

Figures 2A, 2B:
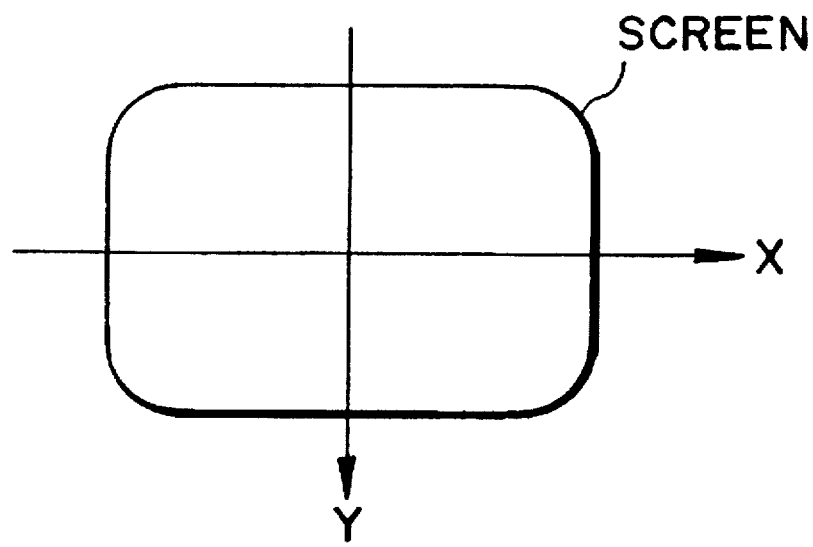
FIG. 2A illustrates an example of a screen coordinate system and FIG. 2B is a table describing horizontal and vertical inversion.

The back-and-front determination section 408 determines whether an input polygon is a backface or a frontface polygon and outputs the result of this determination as the back determination flag (the back determination flag is 1 when the input polygon is a backface polygon). This polygon back-and-front determination is carried out by computing the vector product of the polygon vertex coordinates (X, Y), then obtaining the sign of the Z-coordinate component of this vector product. More specifically, when a two-dimensional polygon is input after perspective projection conversion processing has been carried out in this apparatus, the polygon vertex coordinates (X, Y) are converted into coordinates in the screen coordinate system, as shown in FIG. 2A. Since the depthwise direction in this screen coordinate system is represented by Z coordinates, the back-and-front determination of the polygon may be carried out by obtaining the vector product of the vertex coordinates and the sign of the Z-coordinate component of the vector product. This is equivalent to obtaining the direction of the vector normal to the polygon surface.

The coordinate inversion section 410 inverts the vertex coordinates in accordance with the horizontal and vertical inversion flags set in the setting memory 406. More specifically, the coordinate inversion section 410 inverts the vertex coordinates (X, Y) depending on whether these flags are 0 or 1 (these flags have completely positive logic), as shown in FIG. 2B. For example, if the horizontal inversion flag is 1, the sign of the X vertex coordinates is inverted. Similarly, if the vertical inversion flag is 1, the sign of the Y vertex coordinates is inverted.

Input polygon data is stored and temporarily accumulated in the data memory 412 via the coordinate inversion section 410, based on a memory write address from the input control section 402. At this point, inverted vertex coordinates are stored in the data memory 412 if the coordinate inversion section 410 inverts the coordinates, or non-inverted vertex coordinates are stored if coordinate inversion is not carried out. If vertex brightness information, vertex texture coordinates is given for each vertex of the polygon, that vertex brightness information and vertex texture coordinates is also stored.

The exclusive OR section 414 takes an exclusive OR of the back-and-front determination flag, the horizontal inversion flag, the vertical inversion flag, and outputs the result as an (allocation sequence) switching flag. The exclusive OR section 414 comprises two input exclusive OR circuits 416 and 418. A truth table showing exclusive ORs of these three inputs is shown in FIG. 3A. For example, if it is determined that a polygon is a frontface polygon, and neither horizontal inversion nor vertical inversion is to be processed (the back determination flag=0, the horizontal inversion flag=0, and the vertical inversion flag=0), it is not necessary to switch the order in which the vertices of the polygon are numbered, and thus the switching flag becomes 0. On the other hand, if it is determined that a polygon is a backface polygon, and neither horizontal inversion nor vertical inversion is to be processed (the back determination flag=1, the horizontal inversion flag=0, and the vertical inversion flag=0), it becomes necessary to switch the allocation sequence and thus the switching flag becomes 1. If it is determined that a polygon is a backface polygon, and horizontal inversion is to be processed but not vertical inversion (the back determination flag=1, the horizontal inversion flag=1, and the vertical inversion flag=0), the result is to return the sequence in which numbers are allocated to the vertices to the original order, and thus the switching flag becomes 0. All other cases are as shown in FIG. 3A, with the switching flag becoming 0 when the number of set flags is even, or 1 when the number of set flags is odd.

The allocation sequence switching section 420 switches the allocation sequence (for example, 1, 2, 3, 4) that is input from the output control section 404, in accordance with the switching from the exclusive OR section 414. In other words, when the switching flag is 0, the allocation sequence that is input from the output control section 404 is output without change as (1, 2, 3, 4) to the vertex number assignment section 422, as shown in FIG. 3B. Conversely, if the switching flag is 1, the allocation sequence is switched from (1, 2, 3, 4) to (1, 4, 3, 2) for output to the vertex number assignment section 422.

Note that the present embodiment is described with reference to a case in which N-sided (where N is an integer greater than 2) input polygons are converted for output into four-sided polygons by clipping processing. In contrast, if N-sided polygons are converted for output into three-sided polygons, the allocation sequence (1, 2, 3) is input from the output control section 404 and the allocation sequence switching section 420 either outputs the sequence unchanged as (1, 2, 3) to the vertex number assignment section 422, or switches the sequence to (1, 3, 2) for output to the vertex number assignment section 422.

The vertex number assignment section 422 comprises a polygon subdivision section 424. This divides an N-sided input polygon into one or a plurality of polygons of a predetermined number of vertices, that is, one or a plurality of four-sided polygons. It also assigns the vertex numbers of the original input polygon to the vertices of these four-sided polygonal segments in accordance with a switched allocation sequence that is input from the allocation order switching section 420.

The processing carried out by the vertex number assignment section 422 will now be described with reference to FIGS. 4A, 4B, 5A, and 5B. The switched allocation sequence, polygonal-segment number, and number of vertices of each input polygon are input to the vertex number assignment section 422, and assigned vertex numbers are output therefrom. In this case, the polygonal-segment number indicates the number of the polygonal segment that is currently being processed, as shown in FIGS. 4A and 4B. The assigned vertex numbers indicate which of the vertex numbers of the input polygon are assigned to the polygonal segment.

Assume that n is an integer greater than 1. Assume also that the switched allocation sequence is ASEQ (1 to 4), the polygonal-segment numbers are DPN (1 upward), the number of vertices of the input polygon is NUMV (an integer greater than 2), and the thus obtained assigned vertex numbers are VN.

First consider the case in which NUMV=2n (polygons with 4, 6, 8, 10, . . . sides). In this case, DPN increments sequentially by 1 from 1 to (NUMV−2)/2. In other words, ((NUMV−2)/2) polygons are output, so that two such polygons would be output in the example of a six-sided polygon shown in FIGS. 4A and 4B. These values of DPN are computed by the output control section 404.

When NUMV=2n, in other words, when the number of vertices of the input polygon is even, the assigned vertex numbers VN are computed by the vertex number assignment section 422 in accordance with the following formulae:

VN=1 (for ASEQ=1)

VN=DPN×2 (for ASEQ=2)

VN=DPN×2+1 (for ASEQ=3)

VN=DPN×2+2 (for ASEQ=4)

The computation results obtained from these formulae when the allocation sequence ASEQ is not switched are shown in FIG. 4A. In this figure, DPN is first taken to be 1 and the values of VN for a polygonal segment A are computed. In this case, the values of VN are (1, 2, 3, and 4), in accordance with the above formulae. That is to say, vertex numbers (1, 2, 3, and 4) of the original input polygon are assigned to the vertices of the polygonal segment A. Next, DPN becomes 2 and the values of VN for a polygonal segment B are computed. In this case, the values of VN are (1, 4, 5, and 6), in accordance with the above formulae. That is to say, vertex numbers (1, 4, 5, and 6) of the original input polygon are assigned to the vertices of the polygonal segment B.

The computation results obtained when the allocation sequence ASEQ is switched are shown in FIG. 4B. In this case, the allocation sequence ASEQ differs from the (1, 2, 3, and 4) of FIG. 4A in that the sequence is switched to (1, 4, 3, and 2). In other words, allocation sequence is switched in such a manner that the backface and frontface of the polygon is inverted. The values of VN when DPN is 1 are first computed, and thus the vertex numbers (1, 4, 3, and 2) of the original input polygon are assigned to the vertices of the polygonal segment A. The values of VN when DPN is 2 are then computed, and thus the vertex numbers (1, 6, 5, and 4) of the original input polygon are assigned to the vertices of the polygonal segment B. In this manner, the sequence in which numbers are allocated to the vertices can be made to be counterclockwise for both of the polygonal segments A and B configuring the back-facing polygon, and thus polygonal segments A and B can be output as a frontface polygons.

Now consider the case in which NUMV=2n−1 (polygons with 3, 5, 7, 9, . . . sides). In this case, DPN increments sequentially by 1 from 1 to (NUMV−1)/2. In other words, ((NUMV−1)/2) polygons are output, so that three such polygons would be output in the example of a seven-sided polygon shown in FIGS. 5A and 5B.

When NUMV=2n−1, in other words, when the number of vertices of the input polygon is odd, the assigned vertex numbers VN are computed by the vertex number assignment section 422 in accordance with the following formulae:

$$VN=1 \text{ (for ASEQ=1)}$$

$$VN=DPN \times 2 \text{ (for ASEQ=2)}$$

$$VN=DPN \times 2+1 \text{ (for ASEQ=3)}$$

$$VN=DPN \times 2+2 \text{ (for ASEQ=4 when DPN is not equal to (NUMV−1)/2)}$$

$$VN=1 \text{ (for ASEQ=4 when DPN is equal to (NUMV−1)/2)}$$

Figure 5A:
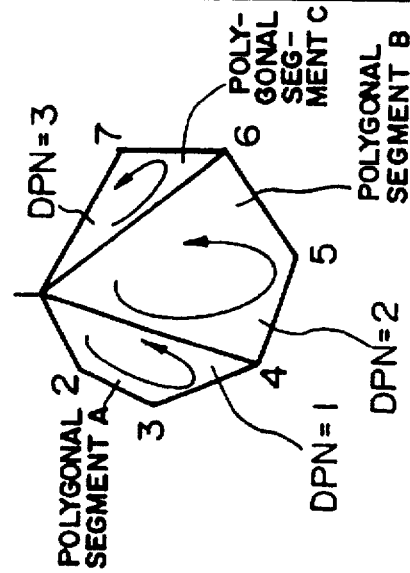
FIGS. 5A and 5B are diagrams illustrating the relationships between DPN, ASEQ, and VN when a seven-sided polygon is segmented.

The computation results obtained from these formulae when the allocation sequence ASEQ is not switched are shown in FIG. 5A. The values of VN are first computed when DPN is 1, so that vertex numbers (1, 2, 3, and 4) of the original input polygon are assigned to the vertices of the polygonal segment A. The values of VN are next computed when DPN is 2, so that vertex numbers (1, 4, 5, and 6) of the original input polygon are assigned to the vertices of the polygonal segment B.

Finally, the values of VN when DPN is 3 are computed. In this case, since DPN=(NUMV−1)/2=3, the value of VN for the fourth vertex of a polygonal segment C is 1, as specified by the above formulae. In other words, the number of vertices of this polygonal segment C is not as many as the predetermined number, which is 4, so the polygonal segment C has a triangular shape. Therefore, since the vertex numbers are assigned to the vertices of the polygonal segment without change, the first vertex number of the input polygon, which is 1, is assigned to a fourth, imaginary vertex of this polygonal segment. This means that vertex numbers (1, 6, 7, and 1) of the original input polygon are assigned to the vertices of the polygonal segment C. The polygon data conversion device outputs this polygon, which actually has a triangular shape, as a four-sided polygon to a subsequent image forming section. The present embodiment thus makes it possible to simplify the drawing by using a hardware configuration for the subsequent image forming section that can draw only four-sided polygons. Therefore correct operation can be guaranteed by this polygon data conversion device, even with an image forming section of such a hardware configuration, by handling three-sided polygons as four-sided polygons.

Figure 5B:
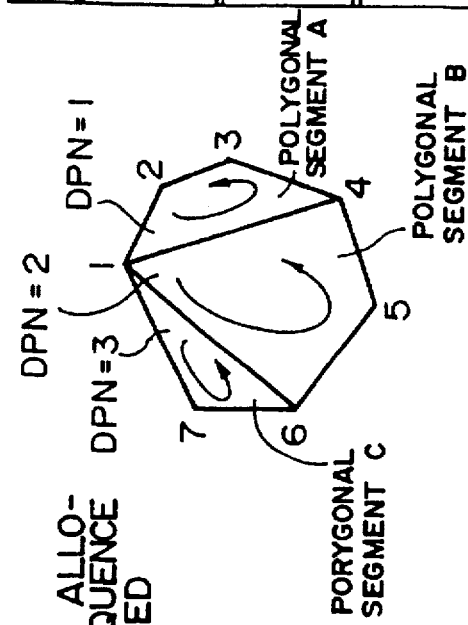

The computation results obtained when the allocation sequence ASEQ is switched are shown in FIG. 5B. The values of VN when DPN is 1 are first computed, and thus the vertex numbers (1, 4, 3, and 2) of the original input polygon are assigned to the vertices of the polygonal segment A. The values of VN when DPN is 2 are then computed, and thus the vertex numbers (1, 6, 5, and 4) of the original input polygon are assigned to the vertices of the polygonal segment B. Finally, the values of VN when DPN is 3 are computed, and thus the vertex numbers (1, 7, 6, and 1) of the original input polygon are assigned to the vertices of the polygonal segment C. In this manner, the sequence in which numbers are allocated to the vertices can be made to be counterclockwise for all of the polygonal segments A, B, and C configuring the backface polygon, and thus A, B, and C can be output as a frontface polygons.

As described above, the vertex number assignment section 422 makes it possible to divide input polygons in which the numbers of vertices has been changed by processing such as clipping into polygons with a predetermined number of vertices, such as four-sided polygons. At the same time, the section may assign the vertex numbers of the original input polygon to the vertices of the these polygonal segments in accordance with a switched allocation sequence.

The real address generation section 426 generates real addresses in memory on the basis of assigned vertex numbers from a vertex number assignment section 424. In this case, information which is necessary to generate real addresses is input from the output control section 404. Each memory read address that is output from the real address generation section 426 is input to the data memory 412, and the vertex coordinates for that input polygon (as specified by the assigned vertex numbers) are read from that memory read address. If horizontal and/or vertical inversion is carried out by the coordinate inversion section 410, the vertex coordinates which are read out are inverted horizontally and/or vertically. If this input polygon data also comprises vertex brightness information and vertex texture coordinates, that information is also read out and is output as output polygon data.

Figure 6:
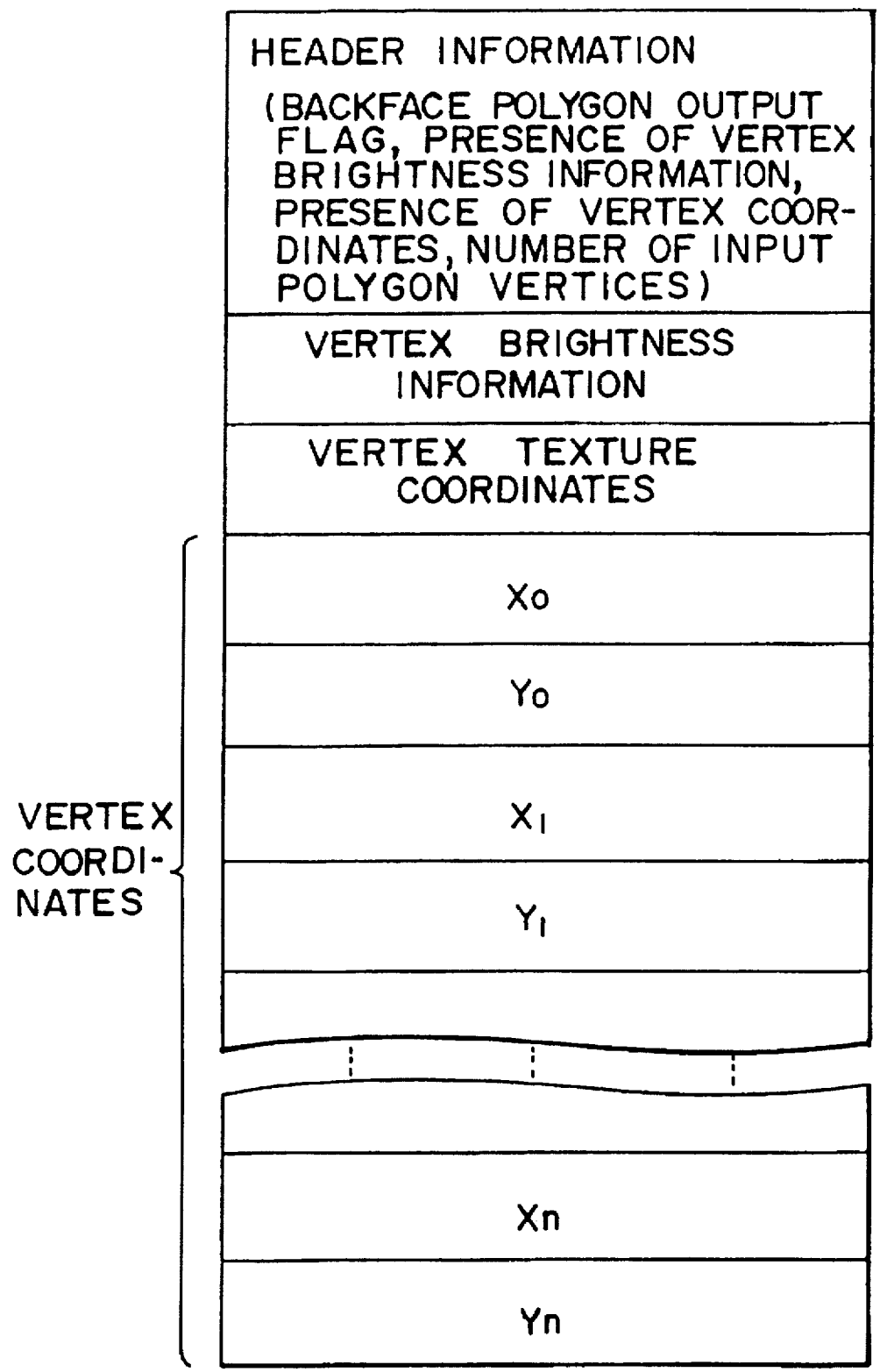
FIG. 6 shows the data format of input polygon data.

The basic format of polygon data that is input to this polygon data conversion device is shown in FIG. 6. In this figure, the polygon data comprises header information, vertex brightness information, vertex texture coordinates, and vertex coordinates. It should be noted, however, that it does not matter whether or not vertex brightness information and vertex texture coordinates is included in this data. The header information comprises the backface polygon output flag which is information that sets whether or not a backface polygon is being output, information which specifies whether or not there is vertex brightness information and whether or not there are vertex texture coordinates, and information on the number of vertices of the input polygon. Since the backface polygon output flag is included within the polygon data in the present embodiment, this backface polygon output flag can be set individually for each polygon. In other words, it is possible to specify output for each polygon, regardless of whether it is a backface polygon. If an attempt is made to form backface polygons for all of the polygons, the computation processing load will be greatly increased. Therefore, if the configuration is such that only polygons that have been specified as necessary by the backface polygon output flag are displayed, and other polygons are not displayed, a particular visual effect can be depicted while the computation processing load is reduced. It should be noted, however, that this backface polygon output flag may be set for all of the polygons displayed on the screen, instead of for each polygon.

The operation of the present embodiment will now be described with reference to FIGS. 7A and 7B.

First of all, an initialization process initializes the entire apparatus. During this time, necessary information is set in places such as the setting memory 406.

The input of polygon data then starts. Thus, input polygon data is written into the data memory 412 at the timing of an input enable signal, as shown in FIG. 7A, in accordance with write addresses generated by the input control section 402. Simultaneously, the input polygon data is also input to the back-and-front determination section 408, to determine whether each polygon is an backface or frontface polygon. This input polygon data is also input to the input control section 402, and corresponding information such as number of vertices of each input polygon and the backface polygon output flag are read in. The number of vertices of the input polygon is output to the output control section 404 and the vertex number assignment section 422, and the backface polygon output flag is output to the output control section 404. When all of the input has been completed in this manner, the input control section 402 outputs an input end flag to the overall control section 400. When the overall control section 400 receives this input end flag, it causes the output control section 404 to operate.

If output is necessary, the output control section 404 causes the polygonal-segment number to be incremented by 1, while changing the allocation sequence of the number of vertices of the input polygon to 1, 2, 3, and 4. These polygonal-segment numbers vary from 1 to the total number of segments in that polygon. This state is shown in FIG. 7B. If output is not necessary, on the other hand, the output control section 404 outputs an output end flag to the overall control section 400 to end this operation. A case may be considered in which the backface polygon output flag determines that a backface polygon is not to be displayed.

The back determination flag, the horizontal inversion flag, and the vertical inversion flag are input to the three inputs of the exclusive OR section 414 to form the switching flag in accordance with the truth table of FIG. 3A. This switches the allocation sequence, if the polygon is a backface polygon but neither horizontal nor vertical inversion is carried out. The allocation sequence is also switched, if the polygon is a frontface polygon and horizontal inversion is carried out but not vertical inversion. In all other cases, the allocation sequence is switched in accordance with FIGS. 3A and 3B.

The switched allocation sequence that is obtained in this manner becomes memory read addresses, via the vertex number assignment section 422 and the real address generation section 426. Thus, polygons are divided into segments and are output correctly as back/frontface polygons. During this time, correct output concerning details such as vertex brightness information and vertex texture coordinates is further enabled by the transfer of necessary information to the real address generation section 426.

Figure 8A:
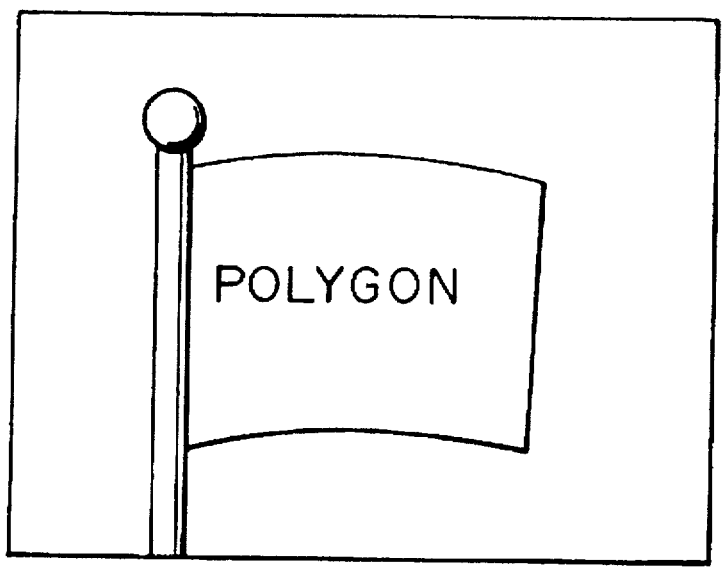
FIGS. 8A and 8B show an example of display screens obtained when an image of a flag is formed in accordance with the present embodiment.
Figure 8B:
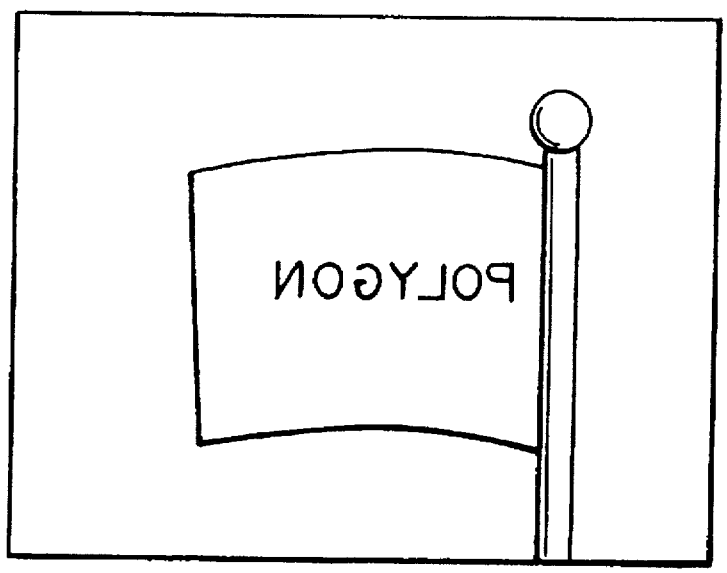

An example of the display screen formed by the synthesis of an image of a flag using the polygon data conversion device of the present embodiment is shown in FIGS. 8A and 8B. FIG. 8A shows the flag as seen from the front side and FIG. 8B shows it as seen from back side. These figures show how the characters that spell out "POLYGON" in FIG. 8A can also be displayed from back side the polygon that forms the flag, as shown in FIG. 8B. With prior-art hardware, it is necessary to combine two polygons back-to-back to enable such a display. In contrast, the apparatus of the present embodiment makes it possible to obtain the visual effect of a flapping flag with patterns on its two sides, by a single polygon.

Figure 9A:
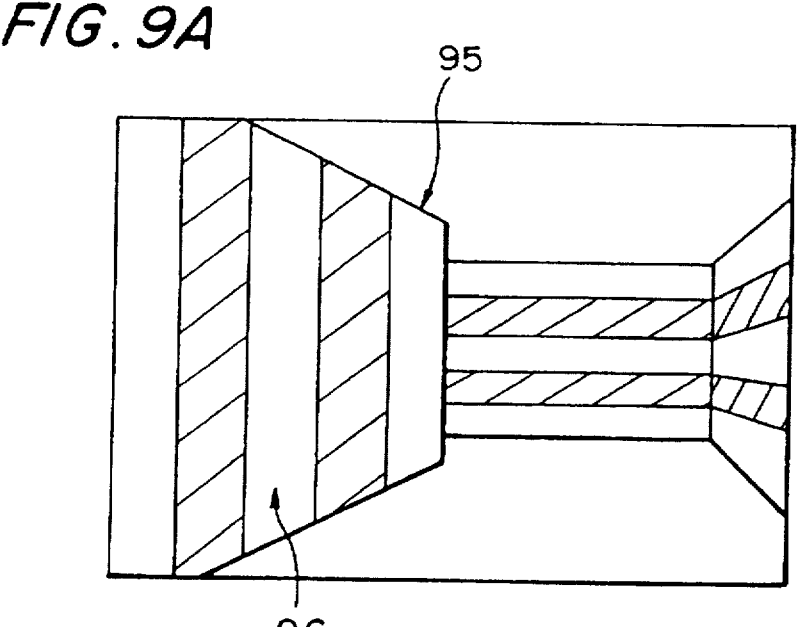
Figure 9B:
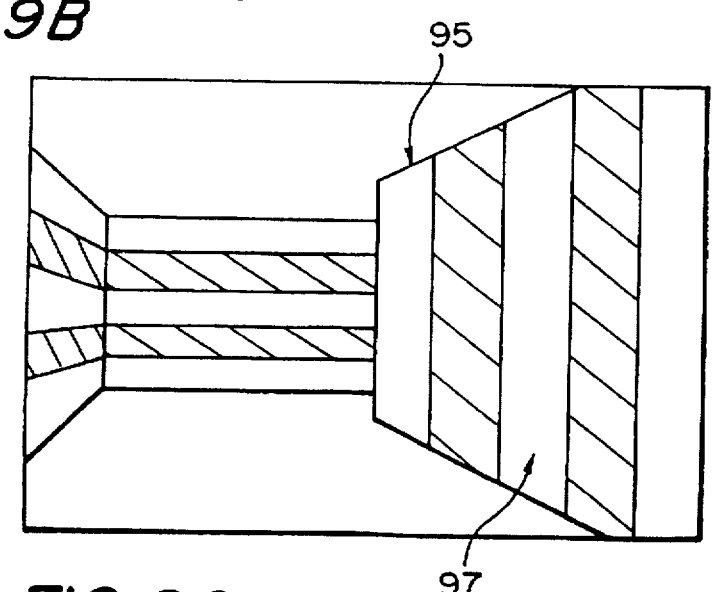
Figure 9C:
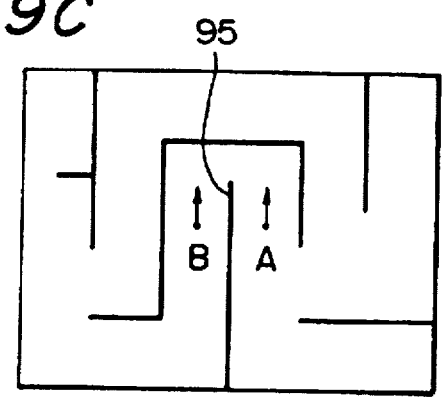
FIG. 9C is a plan view of a three-dimensional(3D) maze, when the present embodiment is applied to a game apparatus using a 3D maze.

FIGS. 9A and 9B show examples of display screens formed by the present embodiment in a game apparatus using a three-dimensional maze shown in FIG. 9C. FIG. 9A shows the display screen as seen from a point A in FIG. 9C, and FIG. 9B shows that as seen from a point B. In this case, a polygon that represents an element such as a wall 95 is set by the backface polygon output flag so that the polygon can be displayed from back side as well as front side. This makes it possible to display a pattern that is depicted on a frontface 96 of the wall 95 in FIG. 9A as an identical pattern on a backface 97 of the wall 95 in FIG. 9B. Since the display enabled in this manner by the present embodiment enables the wall 95 to be represented by a single polygon, the number of polygons necessary for depicting a 3D maze can be reduced by half.

B. Second Embodiment

A second embodiment relates to a three-dimensional(3D) simulator apparatus that includes the present polygon data conversion device.

1. Outline of Game

A typical 3D game enabled by the 3D simulator apparatus of the present invention will first be briefly described.

Figure 10:
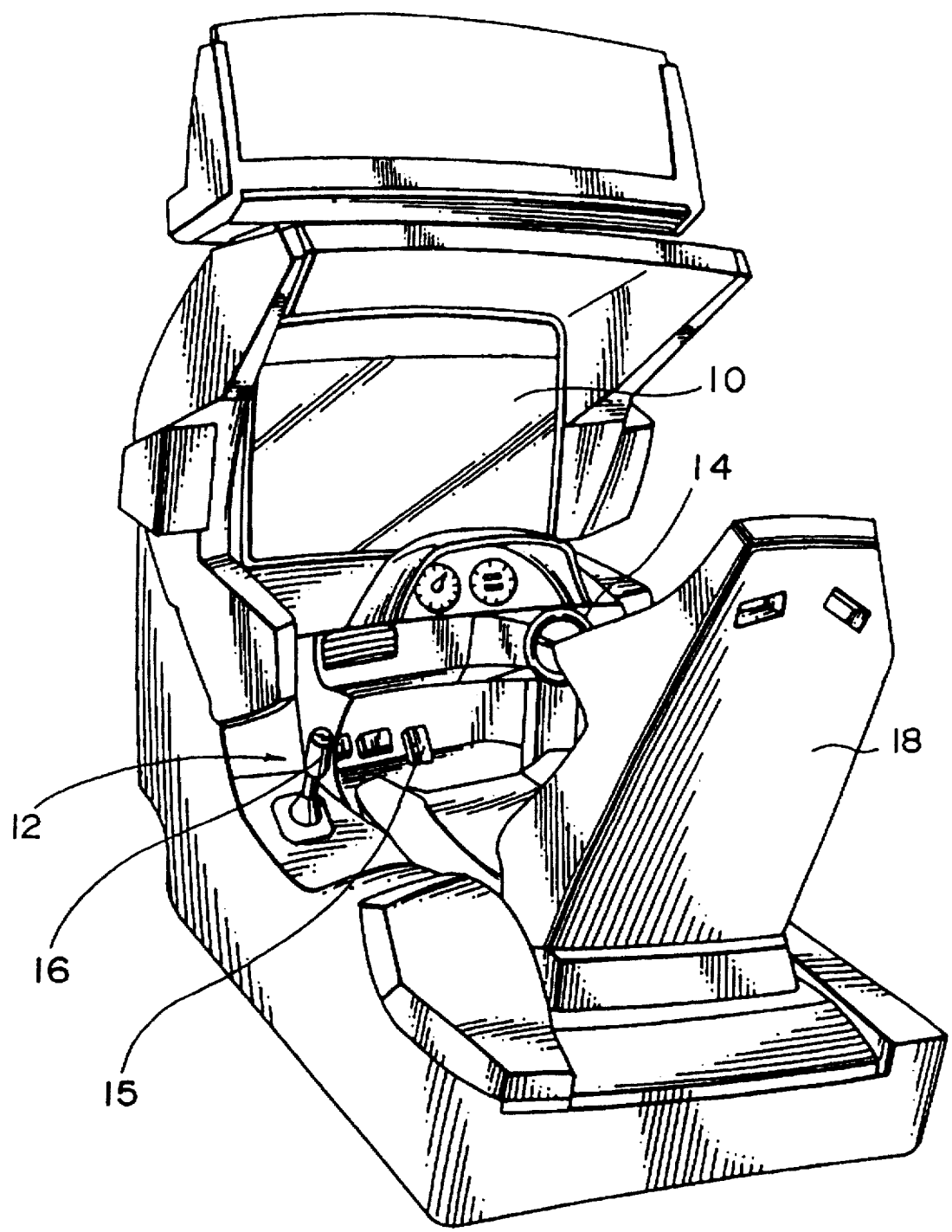
FIG. 10 is a schematic exterior view of an example of a 3D simulator apparatus relating to a second embodiment of the present invention.

The 3D game enabled by this 3D simulator apparatus is a racing-car game in which a moving object, such as the player's racing car runs along a track formed on a map, so that the player can compete against other racing cars operated by other players and other cars operated by a computer. An example of the exterior of the 3D simulator apparatus is shown in FIG. 10. The 3D simulator apparatus is configured in the same manner as the driver's seat of a real-life racing car, as shown in this figure. In this game, the player sits in a seat 18 and drives the imaginary racing car by operating controls such as a steering wheel 14, accelerator pedal 15, and shift lever 16 provided in a control section 12, while viewing a game scene (a pseudo-3D image of the surroundings as seen from the driver's seat of the racing car) that appears on a cathode ray tube(CRT) (display) 10.

Figure 11:
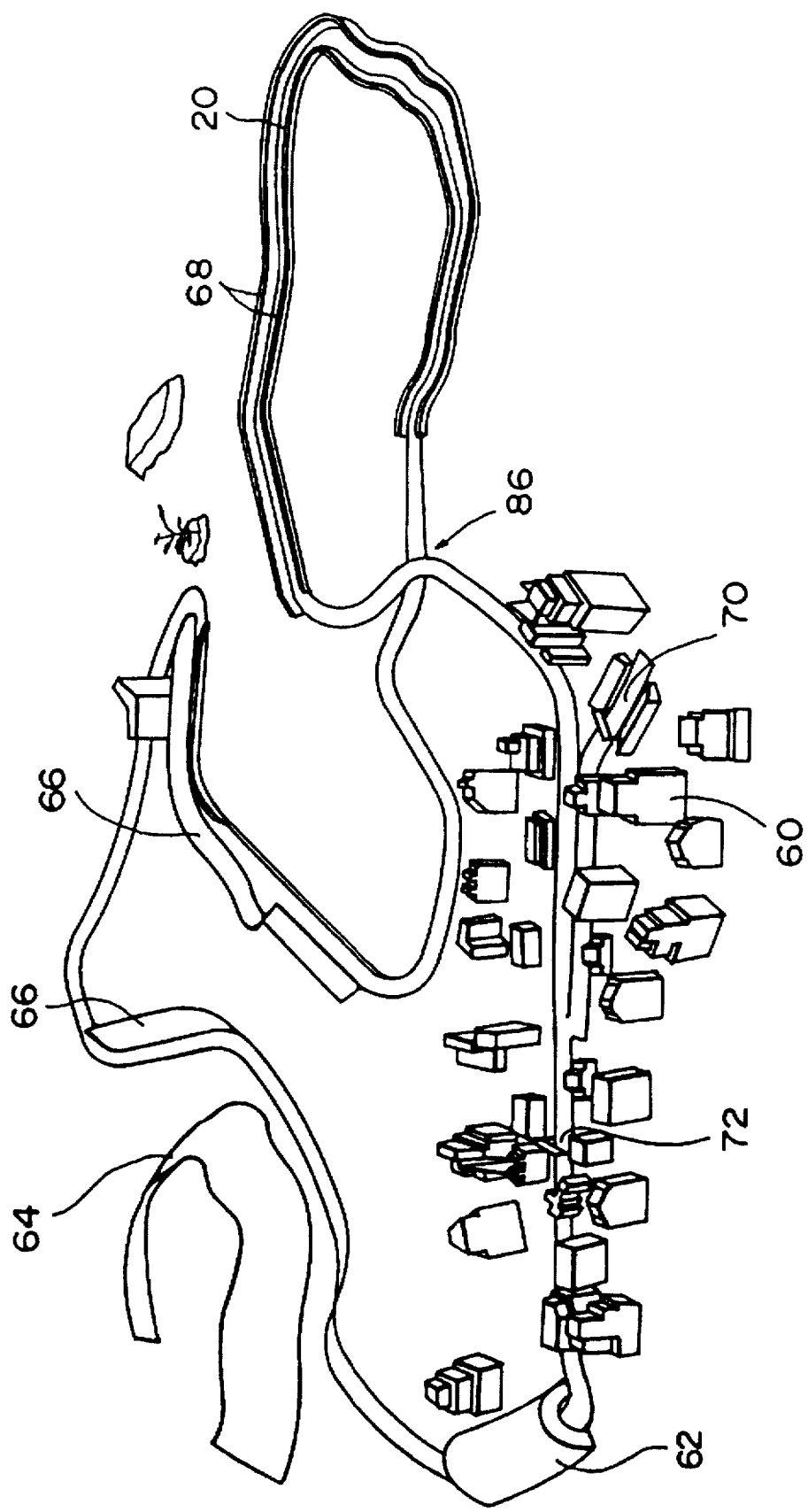
FIG. 11 is a schematic view of an example of a virtual 3D space.

An example of a virtual 3D space within the 3D game is shown in FIG. 11. This figure shows how a track 20 that is formed in a three-dimensional fashion is laid out within the virtual 3D space of the 3D game. Various 3D objects such as buildings 60, a tunnel 62, mountain 64, cliffs 66, and walls 68 are also laid out on the periphery of this track 20. The player operates the racing car while viewing the CRT 10 on which is projected the track and other 3D objects. The player starts from a starting line 70, drives around the track 20 a predetermined number of times until he or she reaches a finishing line, and thus the player's ranking is determined.

Figure 12:
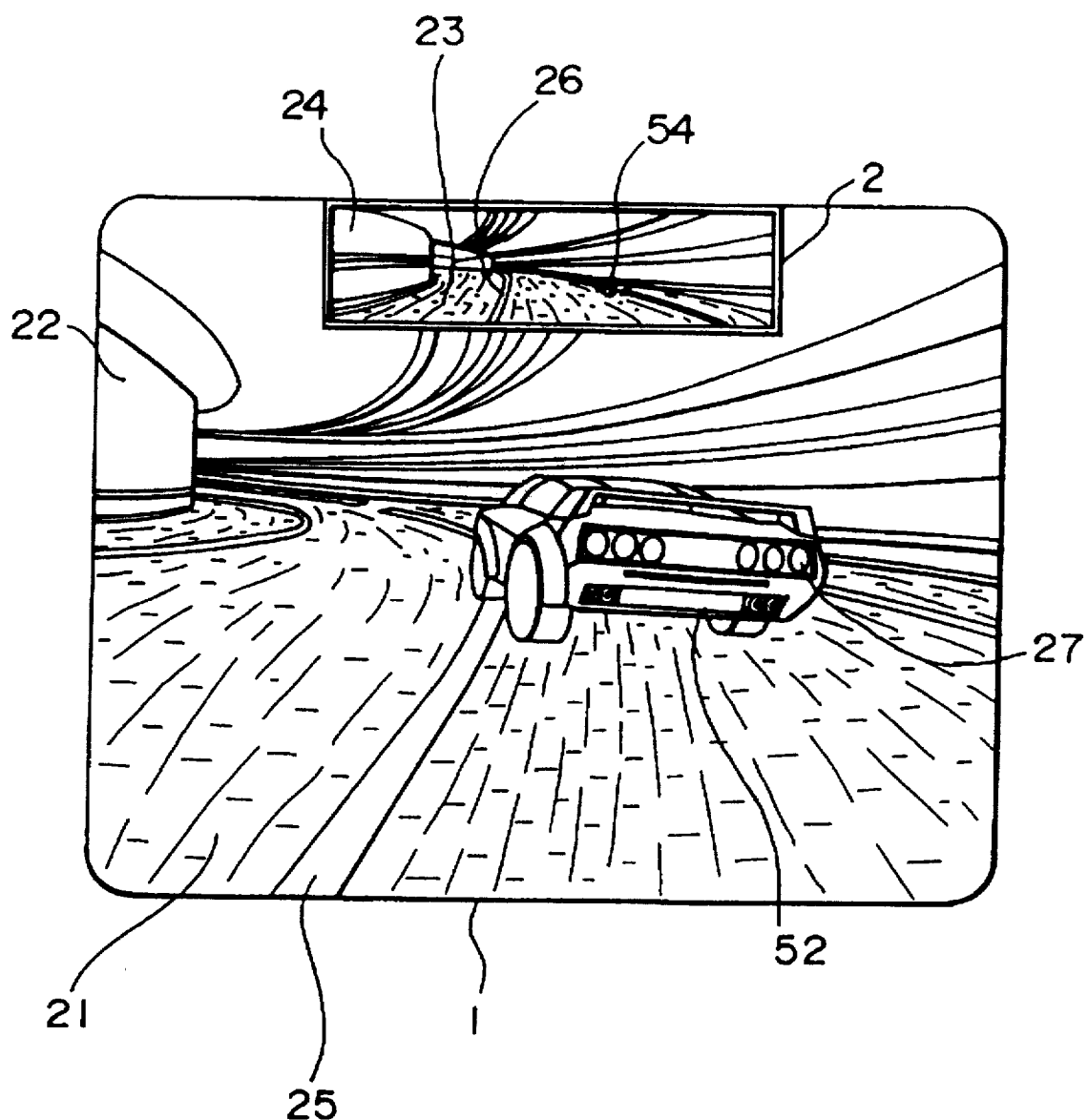
FIG. 12 is a schematic view of a game scene (pseudo-3D image) synthesized by the present 3D simulator apparatus.

An example of the game scene projected on the CRT 10 during the 3D game is shown in FIG. 12. An element of this game such as another player's racing car 52 is displayed on a main screen 1 in FIG. 12, and the player can compete against the other player's racing car 52 while watching this main screen 1. As shown in FIG. 12, elements such as a road surface 21 and tunnel walls 22 are also displayed on the main screen 1, in addition to the other player's racing car 52. A depiction of a rear-view mirror (sub-screen) 2 is also displayed onto the main screen 1, and the player can check whether a computer-operated car 54 is chasing from behind, by looking in the rear-view mirror 2. These extra details enable a huge increase in the immediacy and fun of the game. A road surface 23 and walls 24 are displayed on the rear-view mirror 2, in the same manner as on the main screen. An asphalt-like pattern is applied to the road surface 23 that is displayed on the rear-view mirror 2, similar to that projected on the road surface 21 in the main screen 1, and elements such as a center-line 26 are drawn thereon. In other words, texture mapping is carried out in the same manner as that for the main screen.

In this manner, the present embodiment ensures that the image inverted in the rear-view mirror 2 is just as realistic as that on the main screen 1. This is because a field-of-view image in the virtual 3D space that represents the image inverted in the rear-view mirror 2 is obtained by virtually the same processing as that used for the main screen. Texture mapping therefor is also carried out by the same processing as that for the main screen.

In order to depict such a realistic image, a field-of-view image as seen from the viewpoint of a player facing forward is first obtained, and is displayed on the main screen 1. A field-of-view image as seen by from the viewpoint of a player facing backward is then obtained, horizontal inversion is processed on this field-of-view image, and the thus obtained image is displayed on the rear-view mirror 2. In this case, the horizontal inversion is processed by setting the horizontal inversion flag of the setting memory 406 to 1. More specifically, the horizontal inversion flag is set to 0 during the computation for the polygons that configure the main screen 1, while the horizontal inversion flag is set to 1 for the computation for the polygons that configure the display screen for the rear-view mirror 2. Setting the horizontal inversion flag to 1 causes a horizontal inversion of the vertex coordinates of each polygon by the coordinate inversion section 410. When the horizontal inversion is processed, the polygons become back-facing. This prevents the drawing of these polygons by hardware which cannot draw backface polygons. In contrast, the apparatus of the present embodiment can draw such polygons correctly because it uses the allocation order switching section 420 to switch the sequence in which numbers are allocated to the vertices by setting the switching flag to 1 in such a case. Thus the present embodiment makes it possible to display an extremely realistic image on the rear-view mirror 2, even when using hardware that cannot depict backface polygons.

2. Description of Apparatus Configuration

The description now turns to the configuration of the three-dimensional(3D) simulator apparatus of the present embodiment. This 3D simulator apparatus comprises a control section 12, a virtual 3D space computation section 100, an image synthesis section 200, and a CRT 10, as shown in FIG. 13, with the virtual 3D space computation section 100 being described first.

1) Virtual Three-Dimensional Space Computation Section

Figure 13:
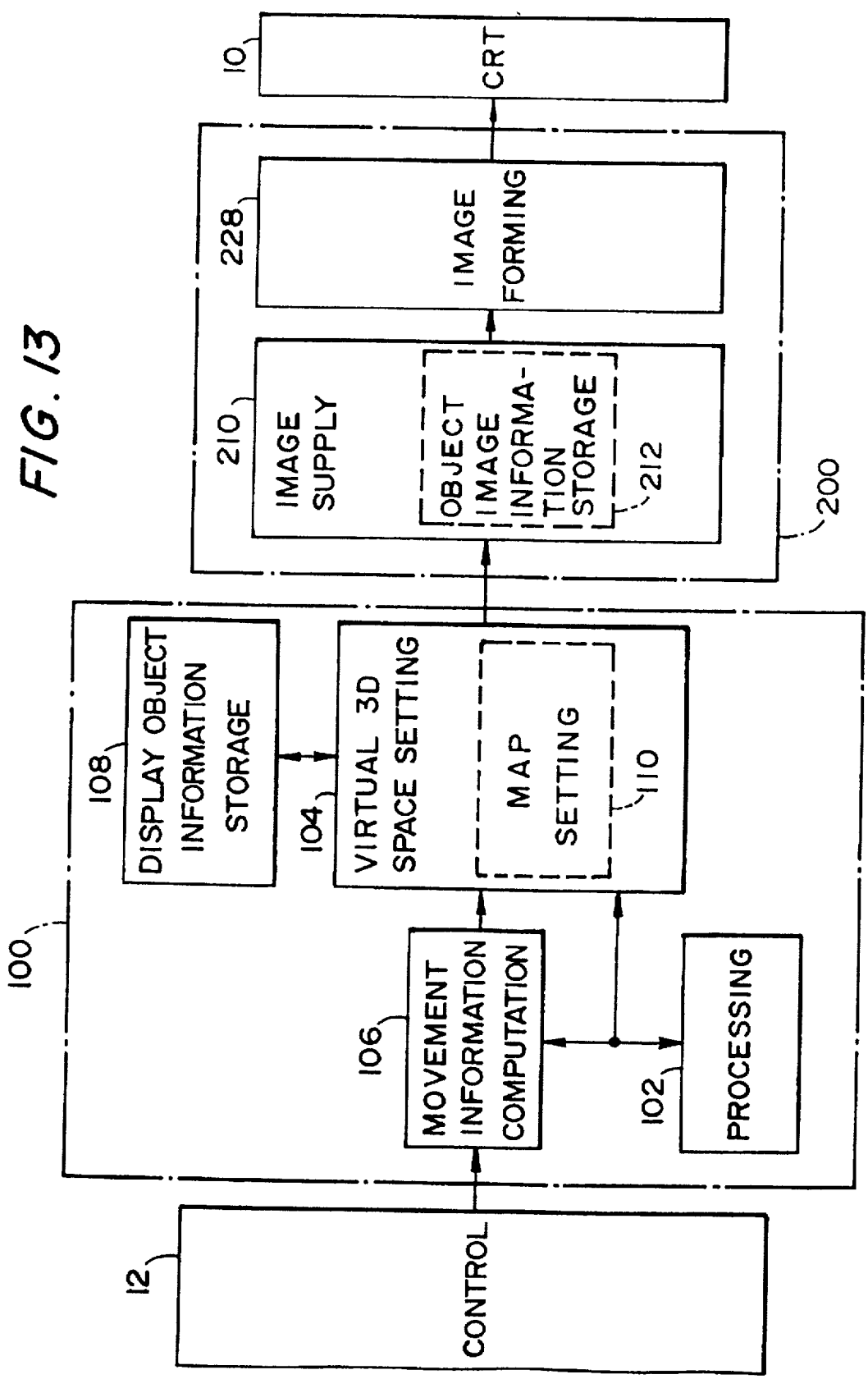
FIG. 13 is a block diagram of an example of the 3D simulator apparatus of the second embodiment focusing on a virtual 3D space computation section.

As shown in FIG. 13, the virtual three-dimensional(3D) space computation section 100 comprises a processing section 102, a virtual 3D space setting section 104, a movement information computation section 106, and a display object information storage section computation section 106, and a display object information storage section (object information storage section) 108.

In the present embodiment, the processing section 102 controls the entire 3D simulator apparatus. A predetermined game program is stored in a memory section that is provided in the processing section 102. The virtual 3D space computation section 100 computes the setting of virtual 3D spaces in accordance with the game program and operating signals from the control section 12.

Movement information for the racing car is computed by the movement information computation section 106 in accordance with operating signals from the control section 12 and instructions from the processing section 102.

Position and orientation information for each display object that configures the 3D virtual space is stored in the display object information storage section 108, together with an object number referring to the object to be displayed at that position (this stored position and orientation information and the object number is hereinafter called display object information (object information)). An example of the display object information stored in the display object information storage section 108 is shown in FIG. 14. The relationship between position and orientation information (Xm, Ym, Zm, θm, Φm, ρm) included in this display object information and an absolute coordinate system (Xw, Yw, Zw) is shown in FIG. 15.

Figure 15:
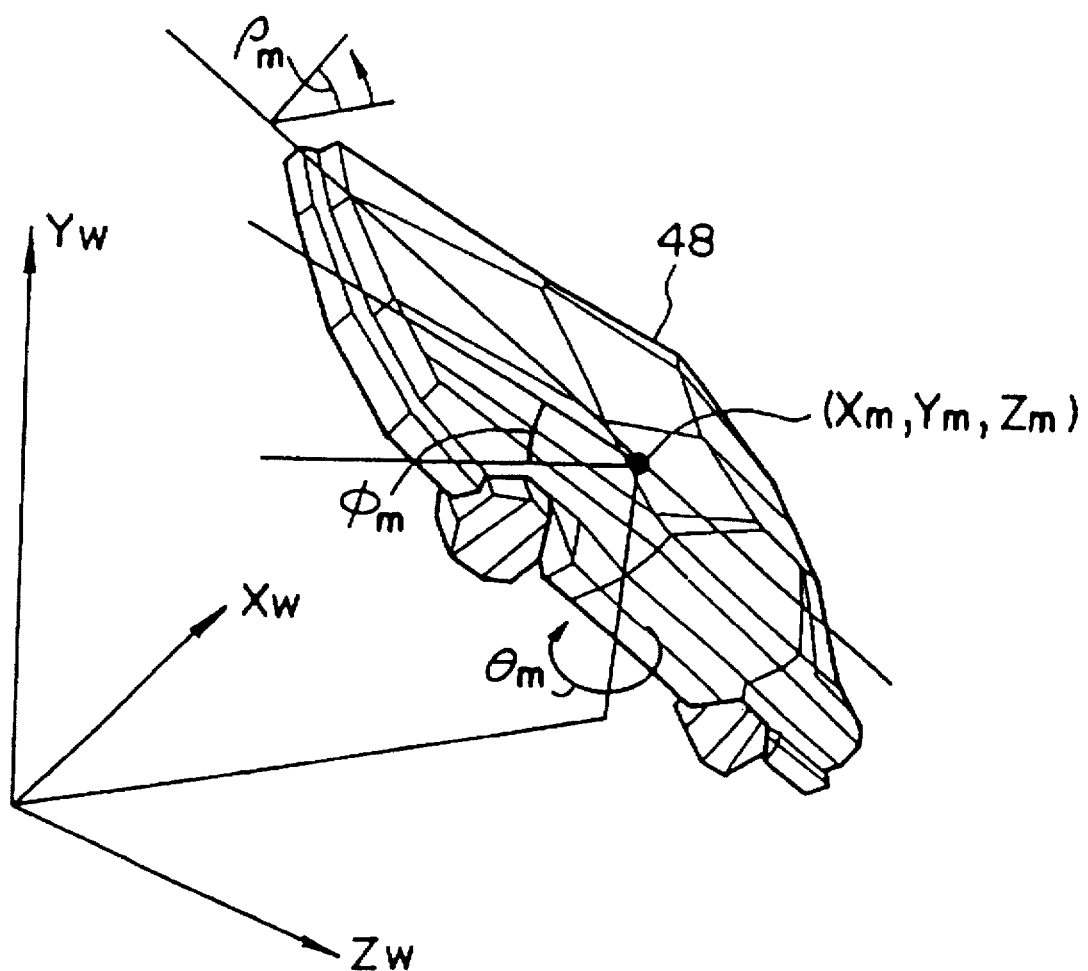
FIG. 15 is a schematic descriptive view of display object information that is set for each object.

In this case, an object is a moving object depicting a racing car or a map object depicting a section of track, and each object is expressed as a collection of four-sided polygons, as shown in FIG. 15.

The display object information stored in the display object information storage section 108 is read out by the virtual 3D space setting section 104. At this point, display object information for the frame before the current frame is stored in the display object information storage section 108. Display object information (position and orientation information) for that particular frame is obtained by the virtual 3D space setting section 104 on the basis of the thus read-out display object information and movement information computed by the movement information computation section 106.

In this manner, display object information for all the display objects that configure the virtual 3D space for that frame is set by the virtual 3D space setting section 104.

Note that a map setting section 100 sets the map when a segmented map is displayed in the virtual 3D space. In addition, to depict a sub-screen (rear-view mirror) on the main screen, the apparatus of the present embodiment forms groups of display object information, such as display object information for the main screen (the display object information shown in FIG. 16A) and display object information for the sub-screen (the display object information shown in FIG. 16B). More specifically, the virtual 3D space setting section 104 reads out the display object information that is stored in the display object information storage section 108, as shown in FIG. 14, and forms groups of display object information by changing only the object number. The thus formed groups of display object information is output to the image synthesis section 200. For example, an object OBO of FIG. 16A and an object OBi+1 of FIG. 16B have the same position and orientation information (X0, Y0, Z0, θ0, Φ0, ρ0) but different object numbers. This use of different groups of display object information makes it possible to specify objects with differing numbers of polygons, so that objects with larger numbers of polygons are displayed on the main screen and objects with smaller numbers of polygons are displayed on the sub-screen. This enables a reduction in the polygons necessary for drawing the sub-screen, making it possible to ensure that the apparatus can form the images in real time.

Image Supply Section

Figure 17A:
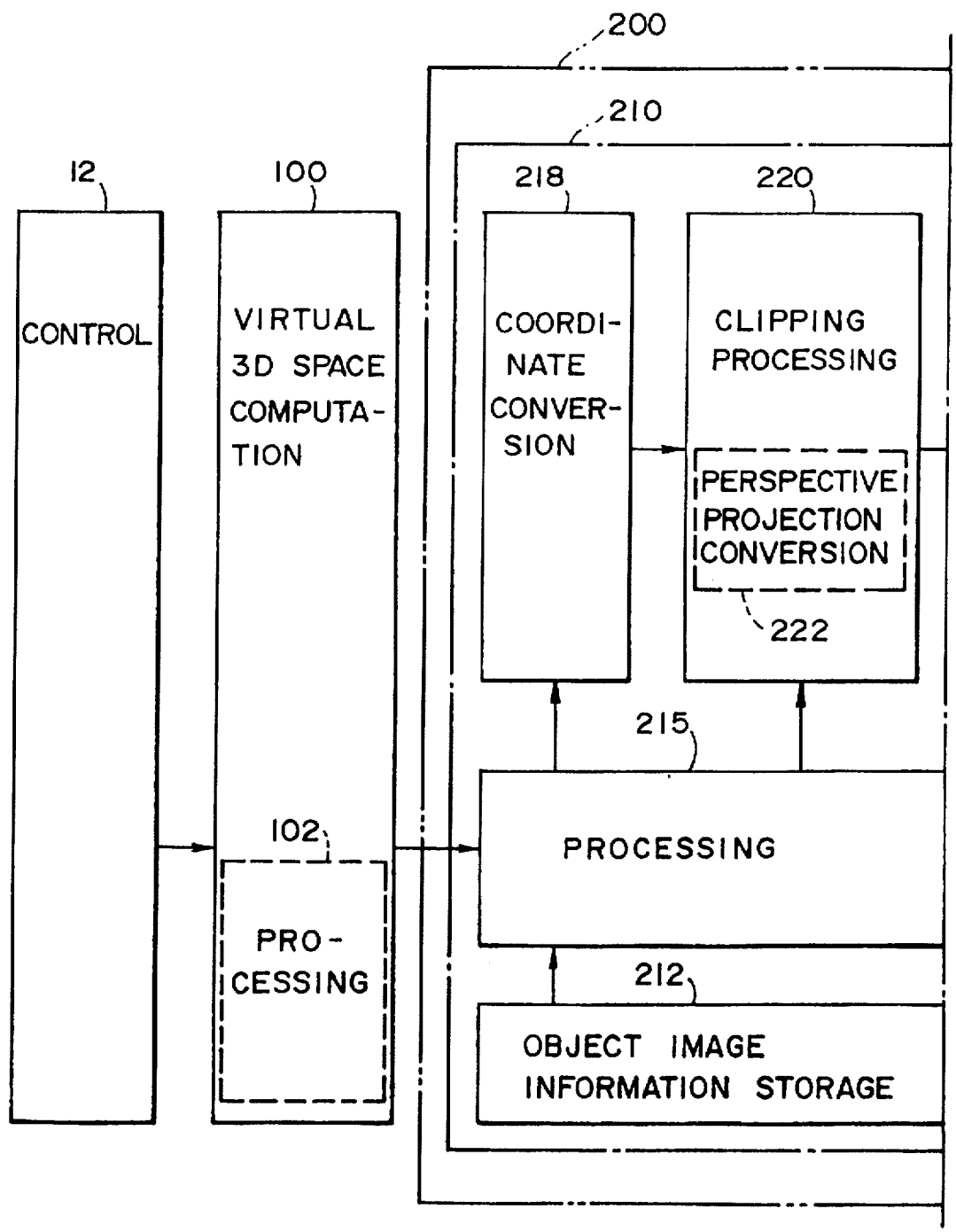
FIG. 17 is a block diagram of an example of an image supply section.
Figure 17B:
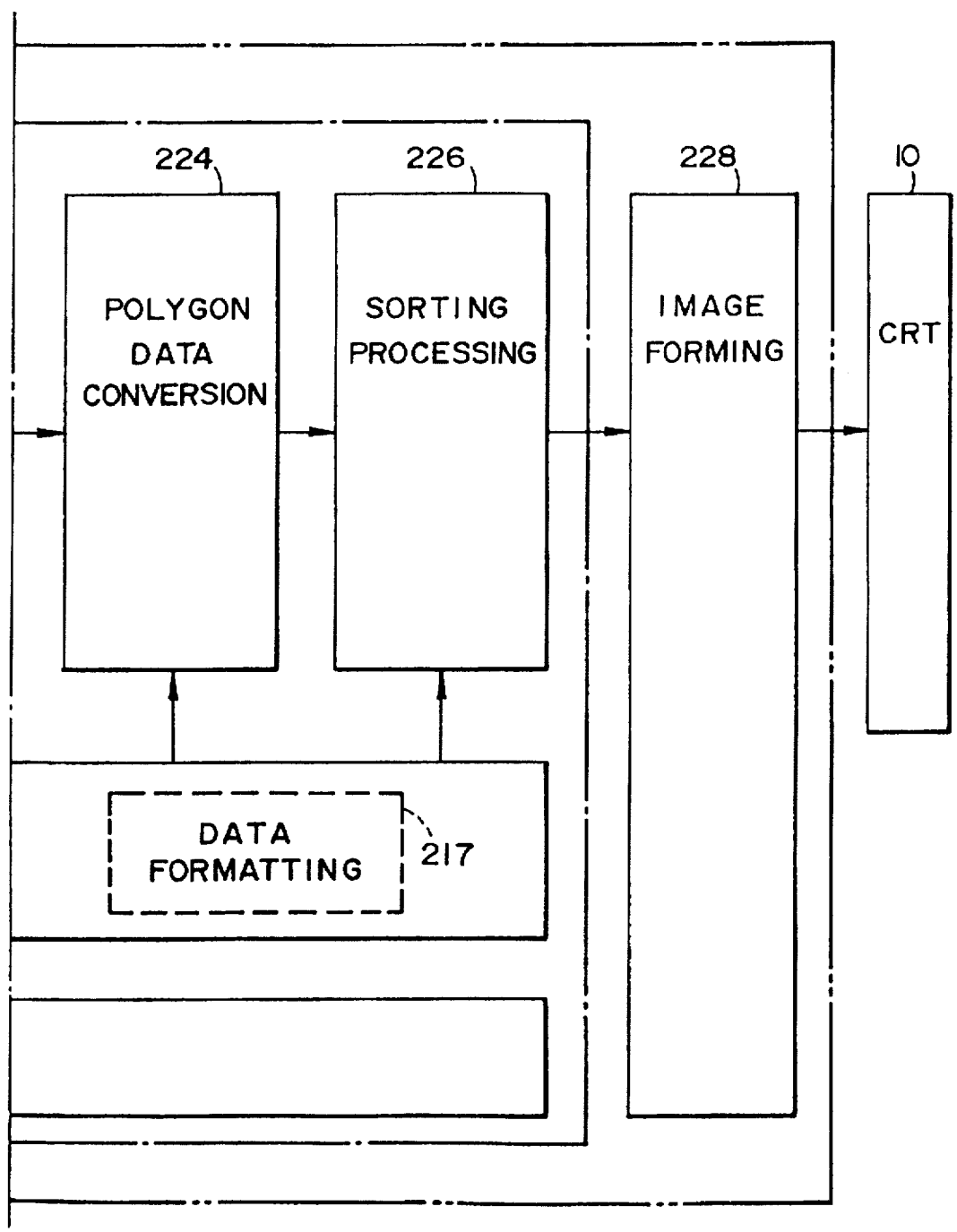

An image supply section 210 comprises an object image information storage section 212, a processing section 215, a coordinate conversion section 218, a clipping processing section 220, a polygon data conversion section 224, and a sorting processing section 226, as shown in FIG. 17. The clipping processing section 220 further comprises a perspective projection conversion section 222.

Various types of coordinate conversion and three-dimensional(3D) computation are processed by the image supply section 210, in accordance with setting information for the virtual 3D space that is set by the virtual 3D space computation section 100.

Figure 18:
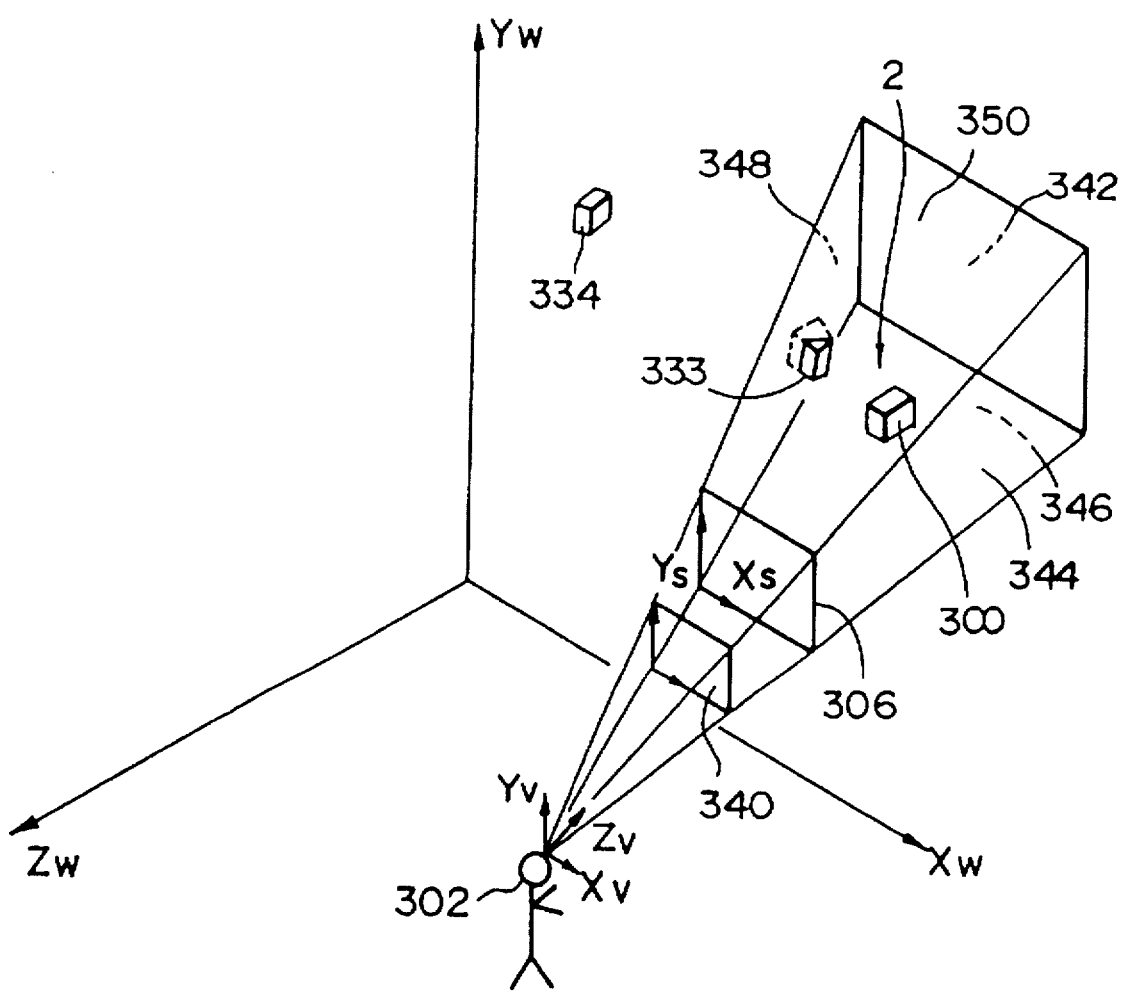
FIG. 18 is a schematic descriptive view of the 3D computation processing of the present embodiment.

First of all, computations are performed for objects 300, 333, and 334 that depict elements such as a racing car and the track, to place the polygons that configure these objects in a virtual 3D space expressed in absolute coordinates (world coordinates) (XW, YW, ZW), as shown in FIG. 18. The coordinates of each of the polygons configuring these objects are then converted into viewpoint coordinates (Xv, Yv, Zv) referenced to the viewpoint of the player 302. Clipping processing is then performed, followed by perspective projection conversion into screen coordinates (XS, YS). The data is converted into predetermined format, and finally the data is sorted in the Z-axis direction.

The operation of the image supply section 210 will now be described in detail.

a) Initialization

At initialization, image information for objects depicting elements such as the racing car and the track is written to the object image information storage section 212. Note, however, that this write is not necessary if the object image information storage section 212 is read-only memory (ROM).

b) Transfer of Frame Data

Viewpoint information that is common to all of the objects, which is information such as the position, angle, and angle of visibility and monitor information, is updated every frame (every 1/60 second, for example) and is transferred from the virtual 3D space computation section 100 through the processing section 215 to the coordinate conversion section 218. The various types of coordinate conversion are performed by the coordinate conversion section 218 on the basis of this data. Information such as the angle and size of the monitor is also transferred to the clipping processing section 220 as data for clipping processing. The thus transferred data is called frame data.

c) Formation of Object Data and Polygon Data

Display object information which comprises position and orientation information and the object number of each object, is transferred from the virtual three-dimensional (3D) space computation section 100 to the processing section 215.

This object number is used as an address to read out image information for the corresponding object from the object image information storage section 212. In other words, if the object number specifies a racing car, for example, image information for that racing car is read from the object image information storage section 212. The image information for each element such as a racing car is stored in the object image information storage section 212 as a collection of polygons (multi-sided figures). A data formatting section 217 forms data that combines the object data and polygon data from the thus read-out data, then the processing section 215 sequentially transfers thus formed data to the coordinate conversion section 218.

In this case, object data is configured of position and orientation information for the object, together with associated data. Polygon data is image information for the polygons that configure each object, which consists of polygon vertex coordinates, vertex texture coordinates, vertex brightness information, and other associated data.

Note that the polygon data described here differs from the polygon data described later with reference to FIG. 6; it is polygon data for 3D polygons that have not been subjected to processing such as perspective projection conversion.

Figure 19A:
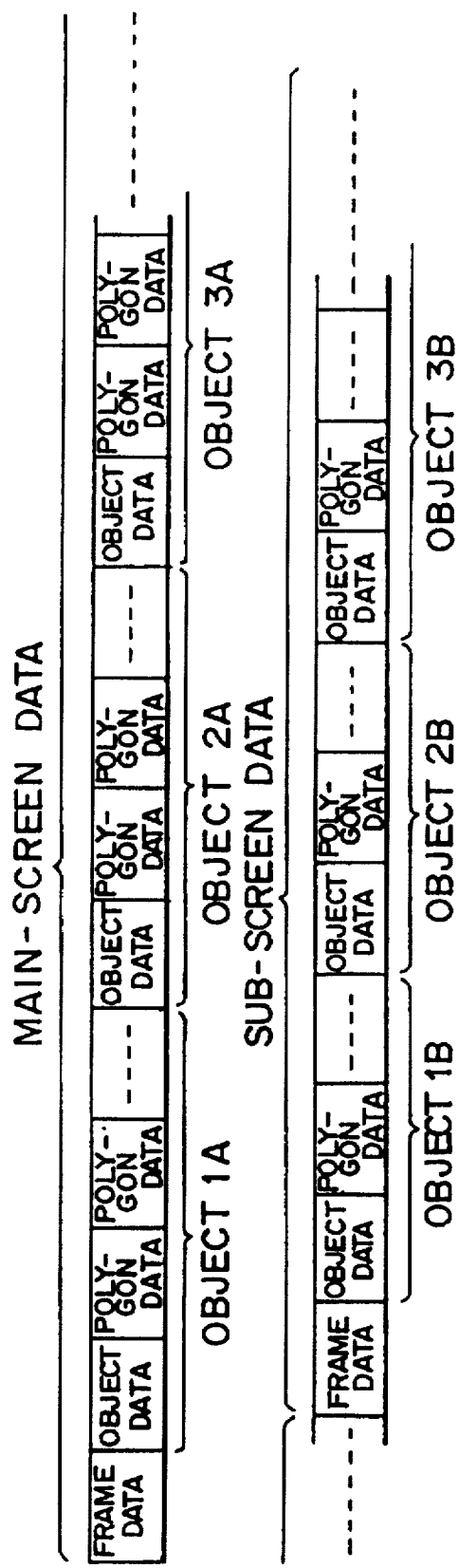
FIGS. 19A and 19B show an example of the data format formed by a data formatting section.
Figure 19B:
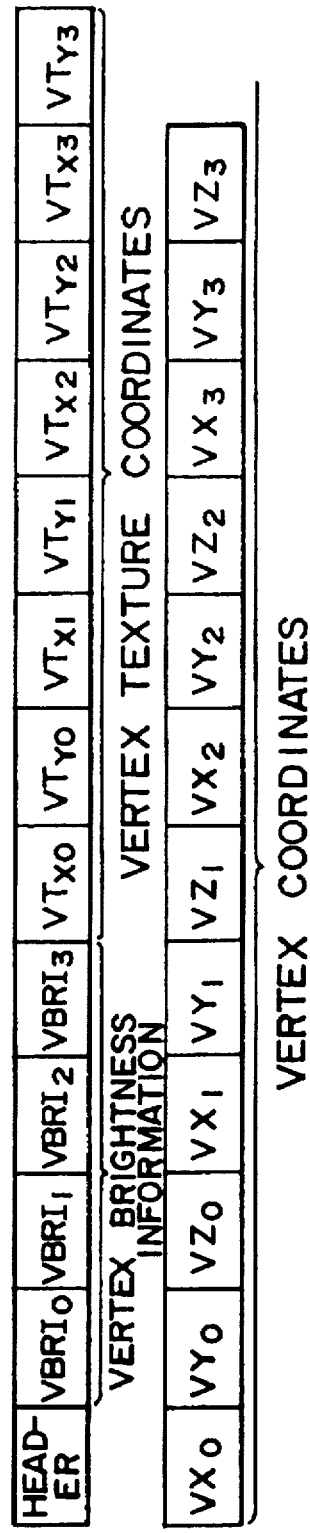

This data is converted by the data formatting section 217 into the data format shown in FIGS. 19A and 19B.

d) Operation of Virtual Three-Dimensional Space Computation Section and the Like The coordinate conversion section 218 subjects the polygon data to various types of coordinate conversion on the basis of object data consisting of player's viewpoint information transferred from the processing section 215 and racing car position and orientation information transferred from the processing section 215. In other words, the polygon data is rotated within the local coordinate system and the viewpoint coordinate system, and is moved laterally into the world coordinate system.

The clipping processing section 220 does clipping processing for polygon data that has been subjected to this coordinate conversion. This data is then subjected to perspective projection conversion into the screen coordinate system by the perspective projection conversion section 222 in the clipping processing section 220. Note that the same hardware can be used for this clipping processing and perspective projection conversion processing in the present embodiment.

The data for polygons (two-dimensional polygon data) that are changed by the clipping processing into polygonal shapes that are not four-sided is input to a polygon data conversion section 224. Further processing such as horizontal inversion, vertical inversion, and backface polygons is then displayed as necessary, and, at the same time, the above deformed polygons are converted into four-sided polygons. The thus-converted polygon data is output to the sorting processing section 226 and an image forming section 228 of the next stage.

With the present embodiment, main-screen data and sub-screen data as shown in FIG. 19A is formed by the data formatting section 217, and this data is transferred to other sections such as the coordinate conversion section 218 as data to be processed within each frame. In this case, the main-screen data starts with frame data, followed by data for objects 1A, 2A, 3A, and so on in sequence. In other words, data relating to all the objects to be displayed on the main screen in that frame is arrayed in sequence. Polygon data for all of the polygons configuring a particular object is arrayed after the object data for object 1A, for example. This polygon data comprises details of the polygons, such as vertex coordinates information, in the format shown in FIG. 19B. In the same manner, polygon data for all of the polygons configuring object 2A is arrayed after the object data for that object.

The sub-screen data is formed with exactly the same format as that of the main-screen data. Note, however, that objects 1A and 1B have the same object placement position and orientation, but different numbers of groups of polygon data linked to the object data. Objects 2A and 2B differ in the same manner. The present embodiment makes it possible to have different numbers of polygons for objects displayed by the main screen and the sub-screen, by having the data formatting section 217 form data in the above format. Further differences such as a difference in viewpoint position or orientation, can be achieved between the main-screen and sub-screen data by changing the contents of the frame data positioned at the start of each of the main-screen data and the sub-screen data. For example, if the frame data for the main screen data is set such that the player's eyes are directed forward and the frame data for the sub-screen data is set such that the player's eyes are directed rearward, a rear-view mirror can be formed on top of the main screen which displays a forward image.

3) Description of Image Forming Section

The image forming section 228 computes image information within polygons, based on vertex image information given for each vertex of these polygons, then output this information to the CRT 10. The image forming section 228 comprises a processor section (texture computation means)

Figure 20:
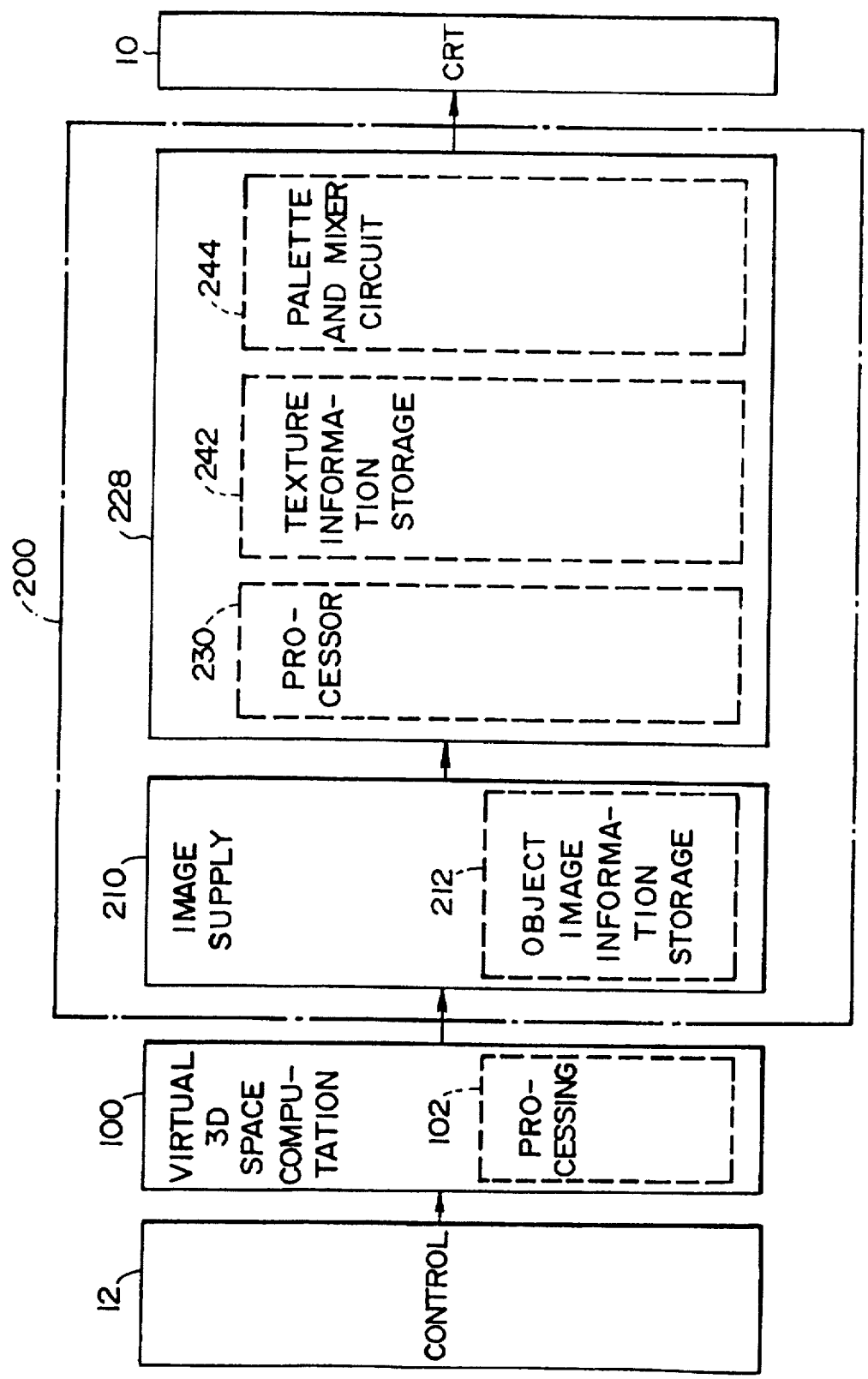
FIG. 20 is a block diagram of an example of an image synthesis section.

230, a texture information storage section 242, and a palette and mixer circuit 244, as shown in FIG. 20.

Figure 21:
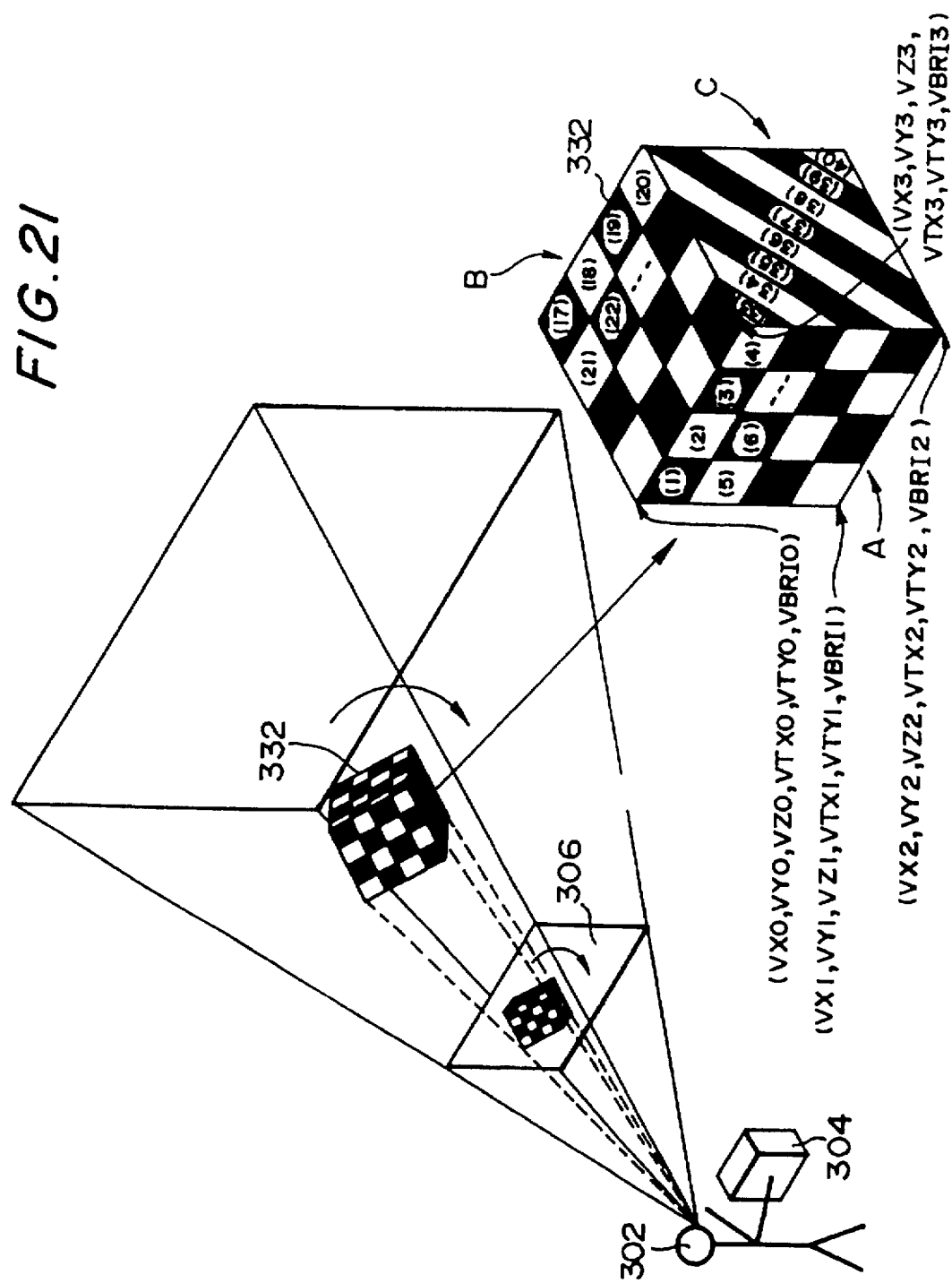
FIG. 21 is a schematic descriptive view of a texture mapping method.

In the present embodiment, image synthesis by a method called texture mapping is carried out in order to form a higher-quality image more efficiently. In other words, the processing is divided in such a manner that coordinate conversion such as rotation, forward movement, and perspective projection conversion and other processing such as clipping for an object 332 shown in FIG. 21 is carried out for each of polygons A, B, and C that configure each of the surfaces thereof (more specifically, for each polygon vertex), and a checkerboard or striped pattern is handled as a texture. That is, the texture information storage section 242 is provided within the image forming section 228, as shown in FIG. 20, and image information for texture information to be applied to each of the 3D polygons, such as a checkerboard or striped pattern, is stored therein.

Addresses in the texture information storage section 242 that specify this texture information are given as vertex texture coordinates VTX, VTY for each 3D polygon (hereinafter, all coordinates relating to vertices are given the prefix. More specifically, vertex texture coordinates (VTX0, VTY0), (VTX1, VTY1), (VTX2, VTY2), and (VTX3, VTY3) are set for each of the vertices of polygon A in FIG. 21.

The processor section 230 within the image forming section 228 obtains texture coordinates TX, TY for all the dots within a polygon, from these vertex texture coordinates VTX, VTY. Corresponding texture information is read out from the texture information storage section 242 by the thus obtained texture coordinates TX, TY, and is output to the palette and mixer circuit 244. This makes it possible to synthesize the image of a 3D object on which a texture such as checks or stripes is implemented, as shown in FIG. 21.

A method called Gouraud shading is also used in the present embodiment to express "roundness" at the boundaries of each polygon. With this method, vertex brightness information VBRI0 to VBRI3 of FIG. 21 is given for each vertex of each 3D polygon, in the same manner as that described above with reference to the texture mapping method. Furthermore, brightness information for all the dots within each 3D polygon is obtained by interpolation from the vertex brightness information VBRI0 to VBRI3, when the final image is displayed by the image forming section 228.

Figure 22:
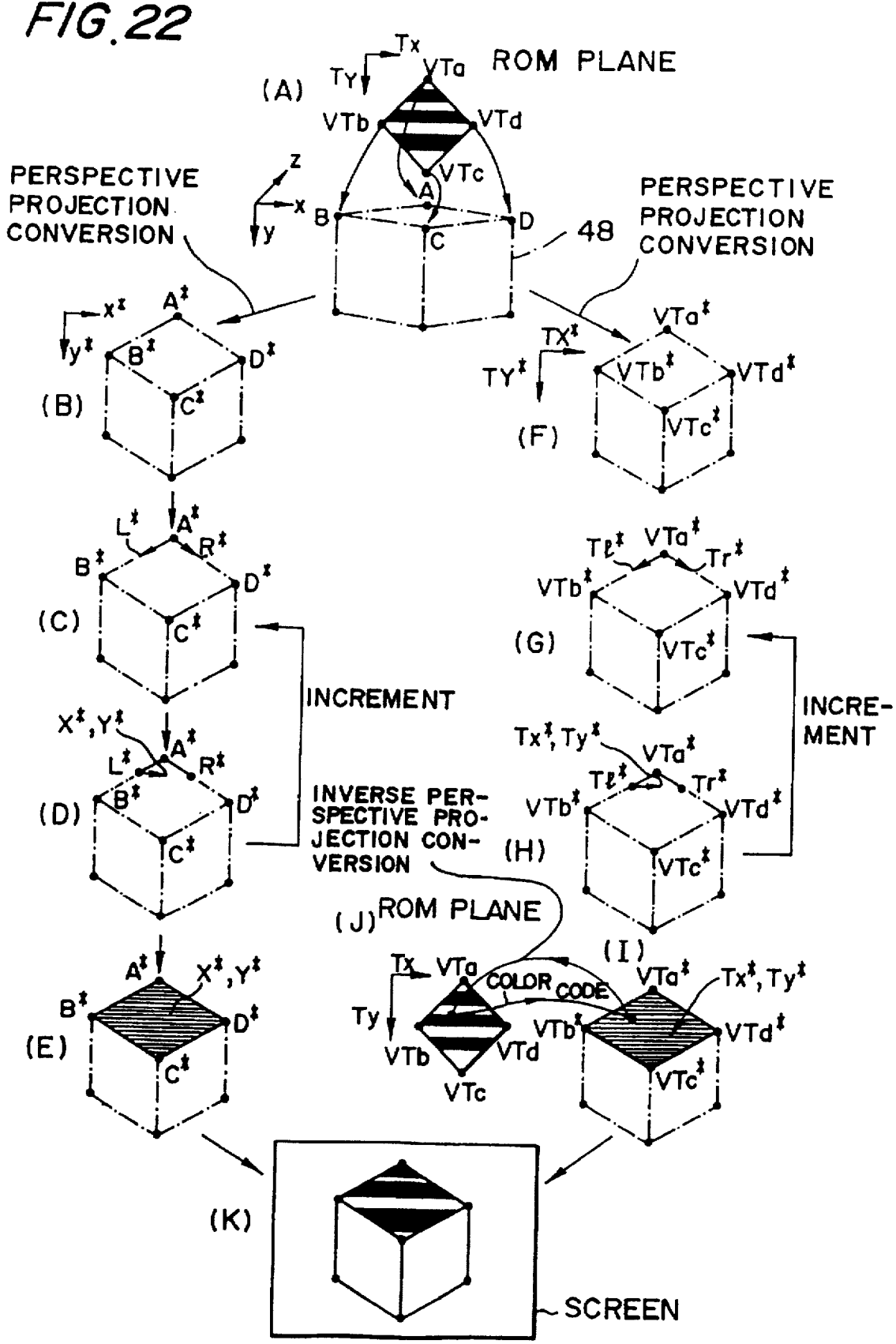
FIG. 22 images (A) to (K), illustrates the flow of computation processing for texture mapping by the present embodiment.
Figure 23A:
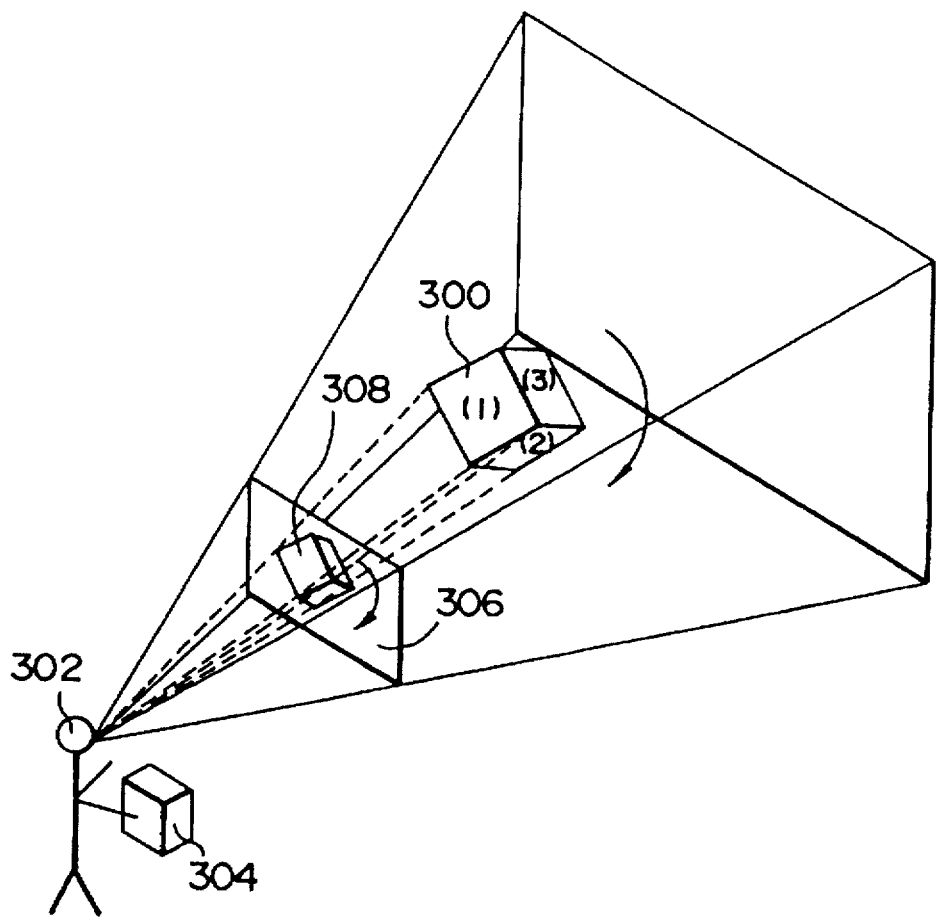
FIG. 23A is a schematic descriptive view used for illustrating the concept of the present 3D simulator apparatus and FIG. 23B shows an example of the screen image formed by the present 3D simulator apparatus.
Figure 23B:
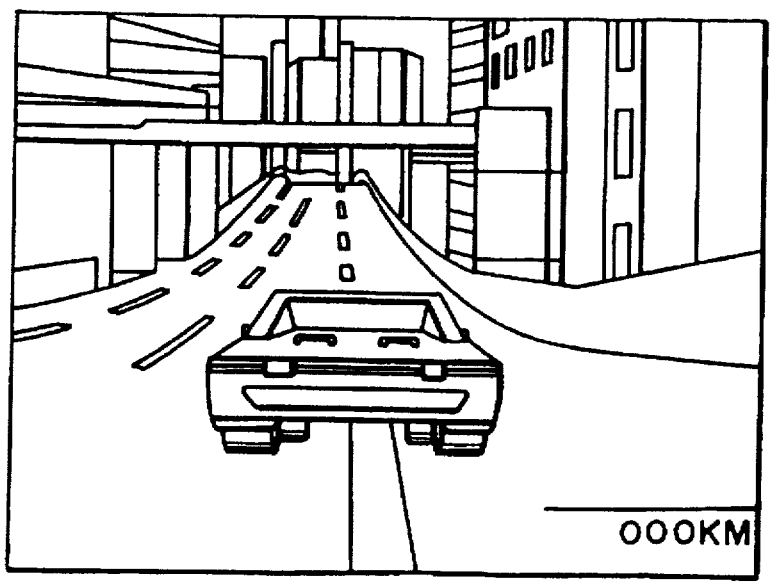

The flow of computation for texture mapping is shown pictorially in images (A) to (K) of FIG. 22. As described previously, computations for forming all of the image information within polygons are performed by the image forming section 228 on the basis of polygon vertex image information. In this case, texture information that is to be applied to the polygons is stored in a texture information storage section 342, and texture coordinates TX, TY are required for reading out the texture information. The computation processing that obtains all of the perspective conversion texture coordinates TX*, TY* within a polygon is shown pictorially in (F), (G), (H), and (I) of FIG. 22. Similarly, the computation processing that obtains perspective conversion display coordinates X*, Y* that are coordinates for the texture information to be displayed is shown pictorially in (B), (C), (D), and (E) of FIG. 22. These computations are performed by the processor section 230. The thus computed perspective conversion texture coordinates TX*, TY* are subjected to inverse-perspective projection conversion into texture coordinates TX, TY, as shown in (J) of FIG. 22, and texture information is read out from the texture information storage section 242 in accordance with the thus converted texture coordinates TX, TY. Finally, image synthesis corresponding to the read-out texture information is performed at the thus computed coordinate position X*, Y*, as shown in (K) of FIG. 22.

With the above described image forming section 228, left and right boundary points on left and right boundary lines of the polygon are first obtained, then image information for all of the dots within the polygon are obtained by interpolation for dots (pixels) along each straight line bounded by pairs of these left and right boundary points. In this case, the decision as to whether a line is a left boundary line or a right boundary line is based on the vertex coordinates. Therefore, if it is assumed that the vertex coordinates are input in the sequence A*, D*, C*, then B* as shown in (B) of FIG. 22 for an back-facing polygon that has been input to the processor section 230, the left boundary line will be determined to be the right boundary line and the right boundary line will be determined to be the left boundary line. Thus the left and right boundary points will be determined to be the other way round. When this image forming section 228 then obtains image information for dots on the straight line bounded by the left and right boundary points, it assumes that there is no data for dots further left than the left boundary point and dots further right than the right boundary point. In other words, this treatment simplifies the computation processing and also reduces the load caused by the computation processing. Therefore, if a backface polygon is input to the above hardware configuration, the left boundary point and right boundary point are determined to be the other way around, and thus the hardware will determine that there is no data for the straight line bounded by the left and right boundary points. This means that backface polygons are not drawn.

To prevent the above situation, the apparatus of the present embodiment uses the polygon data conversion section 224 to switch the sequence in which numbers are allocated to the vertices, so that backface polygons can also be displayed. This makes it possible to display polygons such as those that have been turned into backface polygons by the horizontal inversion during the drawing of a rear-view mirror.

Note that the present invention is not limited to the above described embodiments; it can be implemented in various modified forms within the scope of the claims laid out herein.

For example, the above described embodiments are described with reference to hardware that is capable of carrying out all of the processing simultaneously. Such processing includes taking a polygon that has been turned into a backface polygon by horizontal and/or vertical inversion and converting it into a frontface polygon, converting a backface polygon into a frontface polygon on the basis of the backface polygon output flag, and dividing deformed polygonal shapes that are not four-sided into four-sided polygons. Nevertheless, the present invention is not limited thereto. For example, it may equally well be applied to a hardware configuration that is capable only of taking a polygon that has been turned into a backface polygon by horizontal and/or vertical inversion and converting it into a frontface polygon. In such a case, components such as the exclusive OR section may be omitted. It may also be applied to a hardware configuration that is capable only of converting a backface polygon into a frontface polygon on the basis of the backface polygon output flag. In such a case, there is no need for the horizontal and vertical inversion flags, and components such as the coordinate inversion section. Similarly, if it is unnecessary to convert polygons that are not four-sided into four-sided polygons, there is no need for the vertex number assignment section 422 to divide polygons and assign vertex numbers thereto. However, it should be noted that the polygon data conversion device described with reference to the above embodiments has the great advantage of enabling all of this processing to be carried out by the same hardware configuration, by the provision of the exclusive OR section 414 and the vertex number assignment section 422.

Note also that the polygon data conversion device to which the present invention is applied is not limited to the three-dimensional simulator apparatus described with reference to the second embodiment; it can equally well be applied to 3D simulator apparatuses and image synthesis apparatuses of various other configurations.

In addition, the computations at the virtual 3D space computation section and image supply section may be carried out by a dedicated image processing device, or by such means as a microprocessor.

Similarly, the computations performed by sections such as the image synthesis section are not limited to those described with reference to the embodiment herein, and the method used for texture mapping is not limited to that described above.

The present embodiment is described in correlation with a racing car game by way of example, but the present invention is not limited thereto; it can be applied to any other type of 3D game in which a map is formed in a 3D fashion, such as an outer-space game. Similarly, the present invention is not limited to an arcade 3D game; it can equally well be applied to other purposes such as a domestic games machine, a flight simulator, or a driving simulator used in an educational establishment such as a driving school.

The sub-screen provided by the present invention is not limited to depicting the rear-view mirror described with reference to the embodiment herein; it can equally well be applied to various other depictions. For example, the present invention may be applied to a depiction of a side mirror or a view as seen from above.

The pseudo-3D image formed by the present invention can equally well be displayed by a head-mounted display (HMD), besides the CRT 10.

We claim:

1. A polygon data conversion device that converts polygon data which is input thereto into polygon data of a predetermined format and outputs said converted polygon data, comprising:

coordinate inversion means for horizontally inverting vertex coordinates of an input polygon based on a horizontal inversion flag that is information specifying whether or not horizontal inversion is to be performed;

switching means for switching a sequence of numbers allocated to vertices of said polygon based on said horizontal inversion flag; and output means for outputting horizontally inverted vertex coordinates in accordance with said switched vertex number allocation sequence; and wherein said coordinate inversion means horizontally inverts said vertex coordinates of said input polygon when said horizontal inversion flag is true; and said switching means switches said vertex number allocation sequence to reverse backface and frontface of said polygon, when said horizontal inversion flag is true.

2. The polygon data conversion device as defined in claim 1, further comprising:

assignment means for dividing an input polygon having any number of vertices into at least one polygonal segment having a predetermined number of vertices and said assignment means for assigning vertex numbers of said input polygon to said at least one polygonal segment in accordance with said switched vertex number allocation sequence; and wherein said output means outputs one of said vertex coordinates of said input polygon and said inverted vertex coordinates based on said vertex numbers assigned by said assignment means.

3. The polygon data conversion device as defined in claim 2, wherein said assignment means assigns the first vertex number of said input polygon to a vertex-number-unassigned vertex of a polygonal segment having vertices less than said predetermined number, when said input polygon has an odd number of vertices.

4. The three-dimensional (3D) simulator apparatus comprising a polygon data conversion device in accordance to claim 2, further comprising:

image forming means for forming a field-of-view image from any desired position within a virtual 3D space based on polygon data which is converted by said polygon data conversion device; and wherein said image forming means comprises means for omitting the image forming processing for forming said field-of-view image with respect to polygons having vertices unequal to said predetermined number.

5. The three-dimensional (3D) simulator apparatus comprising a polygon data conversion device in accordance to claim 1, further comprising:

image forming means for forming a field-of-view image from any desired position within a virtual 3D space based on polygon data which is converted by said polygon data conversion device; and wherein said image forming means comprises means for omitting the image forming processing for forming said field-of-view image with respect to polygons wherein vertex numbers are allocated to vertices thereof in a predetermined sequence.

6. A polygon data conversion device that converts polygon data which is input thereto into polygon data of a predetermined format and outputs said converted polygon data, comprising:

coordinate inversion means for vertically inverting vertex coordinates of an input polygon based on a vertical inversion flag that is information specifying whether or not vertical inversion is to be performed;

switching means for switching a sequence of numbers allocated to vertices of said polygon based on said vertical inversion flag; and output means for outputting vertically inverted vertex coordinates in accordance with said switched vertex number allocation sequence; and wherein said coordinate inversion means vertically inverts said vertex coordinates of said input polygon when said vertical inversion flag is true; and said switching means switches said vertex number allocation sequence to reverse backface and frontface of said polygon, when said vertical inversion flag is true.

7. The polygon data conversion device as defined in claim 6, further comprising:

assignment means for dividing an input polygon having any number of vertices into at least one polygonal segment having a predetermined number of vertices and said assignment means for assigning vertex numbers of said input polygon to said at least one polygonal segment, in accordance with said switched vertex number allocation sequence; and wherein said output means outputs one of said vertex coordinates of said input polygon and said inverted vertex coordinates based on said vertex numbers assigned by said assignment means.

8. The polygon data conversion device as defined in claim 7, wherein said assignment means assigns the first vertex number of said input polygon to a vertex-number-unassigned vertex of a polygonal segment having vertices less than said predetermined number, when said input polygon has an odd number of vertices.

9. A polygon data conversion device that converts polygon data which is input thereto into polygon data of a predetermined format and outputs said converted polygon data, comprising:

back-and-front determination means for determining whether an input polygon is a backface or frontface polygon by checking a sequence of numbers allocated to vertices of said polygon;

switching means for switching said vertex number allocation sequence based on a determination result obtained by said back-and-front determination means and a backface polygon output flag that is information specifying whether or not a backface polygon is to be output; and output means for outputting vertex coordinates in accordance with said switched vertex number allocation sequence; and wherein said switching means switches said vertex number allocation sequence to reverse backface and frontface of said polygon, when said back-and-front determination means determines that said input polygon is a backface polygon and also said backface polygon output flag is true.

10. The polygon data conversion device as defined in claim 9, further comprising:

means for individually setting said backface polygon output flag for each polygon that is to be processed.

11. The polygon data conversion device as defined in claim 10, further comprising:

assignment means for dividing an input polygon having any number of vertices into at least one polygonal segment having a predetermined number of vertices and said assignment means for assigning vertex numbers of said input polygon to said at least one polygonal segment, in accordance with said switched vertex number allocation; and wherein said output means outputs one of said vertex coordinates of said input polygon said coordinate inverted vertex coordinates based on said vertex numbers assigned by said assignment means.

12. The polygon data conversion device as defined in claim 11, wherein said assignment means assigns the first vertex number of said input polygon to a vertex-number-unassigned vertex of a polygonal segment having vertices less than said predetermined number, when said input polygon has an odd number of vertices.

13. The polygon data conversion device as defined in claim 9, further comprising:

assignment means for dividing an input polygon having any number of vertices into at least one polygonal segment having a predetermined number of vertices and said assignment means for assigning vertex numbers of said input polygon to said at least one of polygonal segment, in accordance with said switched vertex number allocation sequence; and wherein said output means outputs one of said vertex coordinates of said input polygon and said inverted vertex coordinates based on said vertex numbers assigned by said assignment means.

14. The polygon data conversion device as defined in claim 13, wherein said assignment means assigns the first vertex number of said input polygon to a vertex-number-unassigned vertex of a polygonal segment having vertices less than said predetermined number, when said input polygon has an odd number of vertices.

15. A polygon data conversion device that converts polygon data which is input thereto into polygon data of a predetermined format and outputs said converted polygon data, comprising:

back-and-front determination means for determining whether an input polygon is a backface or frontface polygon by checking a sequence of numbers allocated to vertices of said polygon;

coordinate inversion means for horizontally and vertically inverting vertex coordinates of an input polygon based on a horizontal inversion flag that is information specifying whether or not horizontal inversion is to be performed and a vertical inversion flag that is information specifying whether or not vertical inversion is to be performed;

switching means for switching said vertex number allocation sequence based on a determination result obtained by said back-and-front determination means, said horizontal inversion flag, and said vertical inversion flag; and output means for outputting horizontally and vertically inverted vertex coordinates in accordance with said switched vertex number allocation sequence; and wherein said coordinate inversion means horizontally inverts said vertex coordinates of said input polygon when said horizontal inversion flag is true and vertically inverts said vertex coordinates when said vertical inversion flag is true; and said switching means switches said vertex number allocation sequence to reverse backface and frontface of said polygon when an exclusive OR of the determination result obtained by said back-and-front determination means, said horizontal inversion flag, and said vertical inversion flag directs said vertex number allocation sequence to be switched.

16. The polygon data conversion device as defined in claim 15, further comprising:

assignment means for dividing an input polygon having any number of vertices into at least one polygonal segment having a predetermined number of vertices and said assignment means for assigning vertex numbers of said input polygon to said at least one polygonal segment, in accordance with said switched vertex number allocation sequence; and wherein said output means outputs one of said vertex coordinates of said input polygon and said inverted vertex coordinates based on said vertex numbers assigned by said assignment means.

17. The polygon data conversion device as defined in claim 16, wherein said assignment means assigns the first vertex number of said input polygon to a vertex-number-unassigned vertex of a polygonal segment having vertices less than said predetermined number, when said input polygon has an odd number of vertices.

18. A polygon data conversion method for converting polygon data which is input into polygon data of a predetermined format, comprising:

a coordinate inversion step for horizontally inverting vertex coordinates of an input polygon based on a horizontal inversion flag that is information specifying whether or not horizontal inversion is to be performed;

a switching step for switching a sequence of numbers allocated to vertices of said polygon based on said horizontal inversion flag; and an output step for outputting horizontally inverted vertex coordinates in accordance with said switched vertex number allocation sequence; and wherein said coordinate inversion step horizontally inverts said vertex coordinates of said input polygon when said horizontal inversion flag is true; and said switching step switches said vertex number allocation sequence to reverse backface and frontface of said polygon, when said horizontal inversion flag is true.

19. The polygon data conversion method as defined in claim 18, further comprising:

an assignment step for dividing an input polygon having any number of vertices into at least one polygonal segment having a predetermined number of vertices and said assignment step for assigning vertex numbers of said input polygon to said at least one polygonal segment, in accordance with said switched vertex number allocation sequence; and wherein said output step outputs one of said vertex coordinates of said input polygon and said inverted vertex coordinates based on said vertex numbers assigned by said assignment step.

20. A polygon data conversion method for converting polygon data which is input into polygon data of a predetermined format, comprising:

a coordinate inversion step for vertically inverting vertex coordinates of an input polygon based on a vertical inversion flag that is information specifying whether or not vertical inversion is to be performed;

a switching step for switching a sequence of numbers allocated to vertices of said polygon based on said vertical inversion flag; and an output step for outputting vertically inverted vertex coordinates, in accordance with said switched vertex number allocation sequence; and wherein said coordinate inversion step vertically inverts said vertex coordinates of said input polygon when said vertical inversion flag is true; and said switching step switches said vertex number allocation sequence to reverse backface and frontface of said polygon, when said vertical inversion flag is true.

21. A polygon data conversion method for converting polygon data which is input into polygon data of a predetermined format, comprising:

an back-and-front determination step for determining whether an input polygon is a backface or frontface polygon by checking a sequence of numbers allocated to vertices of said polygon;

a switching step for switching said vertex number allocation sequence based on a determination result obtained by said back-and-front determination step and a backface polygon output flag that is information specifying whether or not a backface polygon is to be output; and an output step for outputting vertex coordinates in accordance with said switched vertex number allocation sequence; and wherein said switching step switches said vertex number allocation sequence to reverse backface and frontface of said polygon, when said back-and-front determination step determines that said input polygon is a backface polygon and also said backface polygon output flag is true.

22. A polygon data conversion method for converting polygon data which is input into polygon data of a predetermined format, comprising:

a back-and-front determination step for determining whether an input polygon is a backface or frontface polygon by checking a sequence of numbers allocated to vertices of said polygon;

a coordinate inversion step for horizontally and vertically inverting vertex coordinates of an input polygon based on a horizontal inversion flag that is information specifying whether or not horizontal inversion is to be performed and a vertical inversion flag that is information specifying whether or not vertical inversion is to be performed;

a switching step for switching said vertex number allocation sequence based on a determination result obtained by said back-and-front determination step, said horizontal inversion flag, and said vertical inversion flag; and an output step for outputting horizontally and vertically inverted vertex coordinates in accordance with said switched vertex number allocation sequence; and wherein said coordinate inversion step horizontally inverts said vertex coordinates of said input polygon when said horizontal inversion flag is true and vertically inverts said vertex coordinates when said vertical inversion flag is true; and said switching step switches said vertex number allocation sequence to reverse backface and frontface of said polygon when an exclusive OR of the determination result obtained by said back-and-front determination means, said horizontal inversion flag and said vertical inversion flag directs said vertex number allocation sequence to be switched.

* * * * *